US010081271B2

(12) United States Patent
Goto et al.

(10) Patent No.: US 10,081,271 B2
(45) Date of Patent: Sep. 25, 2018

(54) VEHICLE SLIDE RAIL DEVICE

(71) Applicant: TOYOTA BOSHOKU KABUSHIKI KAISHA, Aichi-ken (JP)

(72) Inventors: Naoki Goto, Aichi-ken (JP); Hiroyuki Suzuki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/873,045

(22) Filed: Jan. 17, 2018

(65) Prior Publication Data
US 2018/0201161 A1 Jul. 19, 2018

(30) Foreign Application Priority Data

Jan. 18, 2017 (JP) ................ 2017-006680

(51) Int. Cl.
| | | |
|---|---|---|
| *A47C 1/00* | (2006.01) | |
| *B60N 2/12* | (2006.01) | |
| *B60N 2/08* | (2006.01) | |
| *B60N 2/07* | (2006.01) | |

(52) U.S. Cl.
CPC ............ *B60N 2/123* (2013.01); *B60N 2/085* (2013.01); *B60N 2/0705* (2013.01); *B60N 2/0715* (2013.01)

(58) Field of Classification Search
CPC ...... B60N 2/123; B60N 2/085; B60N 2/0705; B60N 2/0837; B60N 2/0856
USPC .......... 248/424, 429, 430; 296/65.13, 65.14; 297/344.1, 340, 341, 342, 313, 314, 297/344.11
See application file for complete search history.

(56) References Cited

U.S. PATENT DOCUMENTS

| | | | | |
|---|---|---|---|---|
| 5,800,015 A | * | 9/1998 | Tsuchiya ............ | B60N 2/0715 248/430 |
| 5,918,846 A | * | 7/1999 | Garrido ............... | B60N 2/123 248/424 |
| 5,931,436 A | * | 8/1999 | Rohee ................. | B60N 2/0705 248/429 |
| 6,098,946 A | * | 8/2000 | Sechet ................ | B60N 2/0705 248/424 |

(Continued)

FOREIGN PATENT DOCUMENTS

JP 2010-125917 6/2010

*Primary Examiner* — Terrell L McKinnon
*Assistant Examiner* — Michael McDuffie
(74) *Attorney, Agent, or Firm* — Greenblum & Bernstein, PLC

(57) ABSTRACT

A vehicle slide rail device including: a memory mechanism which includes a memory member configured to define a default seat position by engagement; a release operation mechanism which is configured to release a lock mechanism from a locked state and slide together with the memory member in a slide direction by removing the memory member from a state of defining the default seat position; a memory operation mechanism which is configured to release the lock mechanism from the locked state while leaving the memory member in the state of defining the default seat position; a cancel mechanism which is pressed against the memory member to cancel the releasing of the lock mechanism by the memory operation mechanism and return the lock mechanism to the locked state when the seat position is returned to the default seat position defined while an operated state of a memory operation member is maintained.

2 Claims, 28 Drawing Sheets

(56) References Cited

U.S. PATENT DOCUMENTS

| | | | | |
|---|---|---|---|---|
| 6,457,775 B2* | 10/2002 | Timon | ............... | B60N 2/0705 |
| | | | | 248/429 |
| 7,926,875 B2* | 4/2011 | Schmale | ............... | B60N 2/123 |
| | | | | 297/344.11 |
| 8,196,888 B2* | 6/2012 | Yamada | ............... | B60N 2/0705 |
| | | | | 248/423 |
| 8,215,602 B2* | 7/2012 | Walter | ............... | B60N 2/0705 |
| | | | | 248/424 |
| 8,528,860 B2* | 9/2013 | VanderWolk | ...... | B64D 11/0696 |
| | | | | 244/118.5 |
| 8,616,515 B2* | 12/2013 | Hayashi | ............... | B60N 2/0705 |
| | | | | 248/424 |
| 8,708,299 B2* | 4/2014 | Kitamura | ............... | B60N 2/073 |
| | | | | 248/424 |
| 9,475,408 B2* | 10/2016 | Kim | ............... | B60N 2/0705 |
| 9,849,810 B2* | 12/2017 | Nihonmatsu | ........ | B60N 2/0881 |
| 2005/0230591 A1* | 10/2005 | Smith | ............... | B60N 2/0705 |
| | | | | 248/429 |
| 2011/0198906 A1* | 8/2011 | Wojatzki | ............... | B60N 2/0818 |
| | | | | 297/344.11 |

* cited by examiner

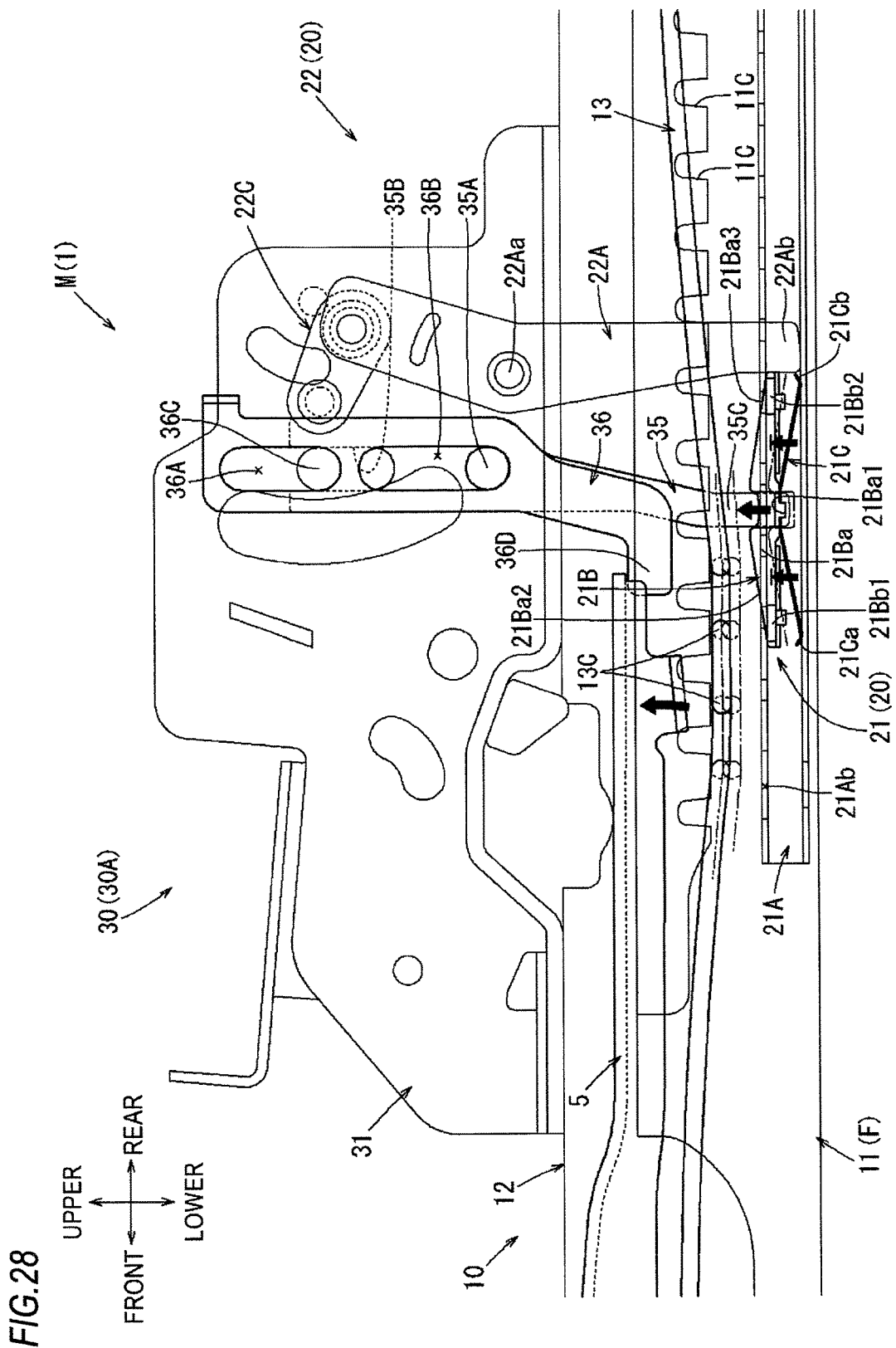

VEHICLE SLIDE RAIL DEVICE

CROSS-REFERENCE TO RELATED APPLICATIONS

This application claims priority from Japanese Patent Application No. 2017-006680 filed on Jan. 18, 2017, the entire contents of which are incorporated herein by reference.

TECHNICAL FIELD

The disclosure relates to a vehicle slide rail device. Specifically, the disclosure relates to a vehicle slide rail device including a slide rail which is capable of adjusting a seat position when a lock mechanism is released and a memory mechanism which includes a memory member configured to define a default position, which is the seat position before change, by mechanical engagement to allow the seat position to return to the default position.

BACKGROUND

As a mechanism for connecting a vehicle seat to a floor in a slidable state, one disclosed in JP-A-2010-125917 is known. This mechanism includes a slide rail that is capable of adjusting a seat position when a lock mechanism is released and a memory mechanism configured to define a default position, which is the seat position before change, by mechanical engagement to allow the seat position to return to the default position. In an initial state, the lock mechanism is held in a state where the seat position is locked. The lock mechanism is adapted to be switched to a released state in which the seat position can be adjusted by operating a release lever. The memory mechanism is configured to be operated by a memory lever provided separately from the above-described release lever.

Specifically, in the above-described memory mechanism, the release operation of the above-described lock mechanism is performed by the operation of the memory lever described above. Further, a memory member is left in a state of being engaged at the slide position at which the release operation is performed, and other members are separated into a state of being movable in a sliding direction together with a vehicle seat. Then, in the memory mechanism, by returning the seat position to the default position after changing the seat position, the other members moving together with the above-described vehicle seat are brought into contact with the memory member left in the default position and are moved to return the lock mechanism to a locked state. In the above-described memory mechanism, normally, when the operation of the release lever is performed and the seat position is changed, the memory member is operated to be shifted from a state of defining the default position by the release lever and moves together with the seat to change the default position to a new position as the seat position changes and moves.

In the above related art, the lock mechanism is held in a position where it is released by operating the memory lever. Therefore, the operation of the release lever cannot be returned until the seat position is returned to the default position, and thus, it is not convenient to lock the seat position at an arbitrary position.

SUMMARY

An object to be achieved by the disclosure is to improve the convenience of the memory mechanism for defining the default position of the seat position.

According to a first aspect of the disclosure, there is provided a vehicle slide rail device including: a slide rail which is capable of adjusting a seat position when a lock mechanism is released; a memory mechanism which includes a memory member configured to define a default position, which is the seat position before change, by mechanical engagement to allow the seat position to return to the default position; a release operation mechanism which is configured to release the lock mechanism from a locked state and slide together with the memory member in a slide direction by removing the memory member from a state of defining the default position; a release operation member which is configured to operate the release operation mechanism by transmitting an operating force to the release operation mechanism; a memory operation mechanism which is configured to release the lock mechanism from the locked state while leaving the memory member in the state of defining the default position; a memory operation member which is configured to be operated into an operated state in which an operating force is transmitted to the memory operation mechanism so as to operate the memory operation mechanism and which is configured to return the memory operation mechanism to a state before the operation when the memory operation member is returned from the operated state; and a cancel mechanism which is pressed against the memory member to cancel the releasing of the lock mechanism by the memory operation mechanism and return the lock mechanism to the locked state when the seat position is returned to the default position defined by the memory member while the operated state of the memory operation member is maintained.

BRIEF DESCRIPTION OF DRAWINGS

FIG. 28 is a side view showing a state in which the operation of the loop handle is released at a position deviated from a lock position when changing the seat position shown in FIG. 14.

DETAILED DESCRIPTION

Figure 1:
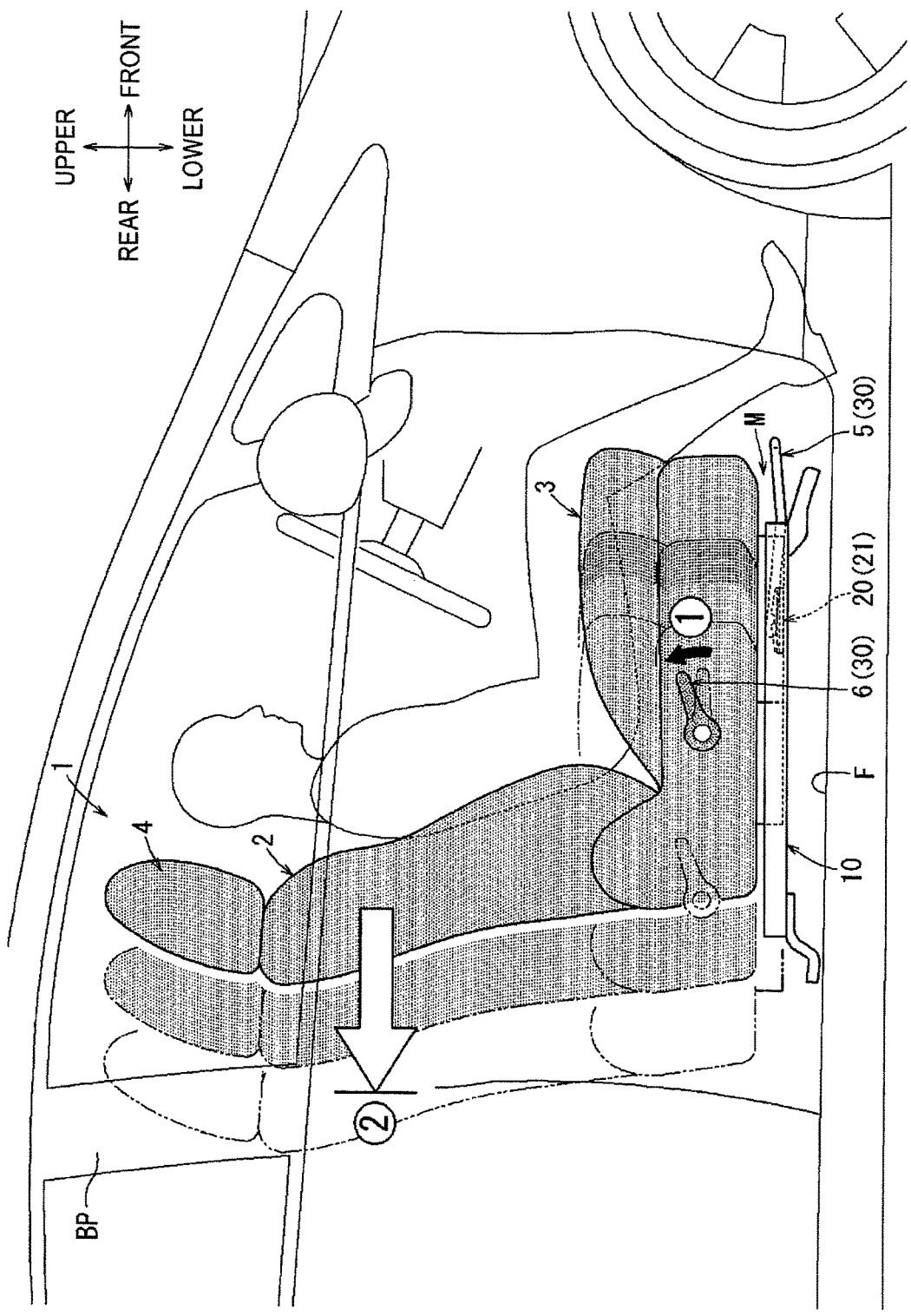
FIG. 1 is a side view showing a schematic configuration of a vehicle slide rail device according to a first embodiment.

Hereinafter, embodiments for carrying out the disclosure will be described with reference to the drawings.

First Embodiment

<Schematic Configuration of Slide Rail Device M>

First, a configuration of a seat 1 to which a slide rail device M (vehicle slide rail device) of a first embodiment is applied will be described with reference to FIGS. 1 to 28. As shown in FIGS. 1 to 4, the seat 1 of the present embodiment is configured as a driver's seat of a right-hand drive vehicle. The seat I includes a seat back 2 serving as a backrest of a seated occupant, a seat cushion 3 serving as a seating part, and a headrest 4 serving as a head support part. The above-described seat cushion 3 is provided in a state of being connected to a vehicle floor F via a pair of left and right slide rails 10 configuring the above-described slide rail device M. Further, the seat back 2 is provided in a state of being connected to a rear end portion of the above-described seat cushion 3 via a recliner (not shown). Further, the headrest 4 is mounted on an upper portion of the seat back 2.

Meanwhile, in the following description, the directions such as a front and rear direction, an upper and lower direction and a right and left direction refer to the respective directions as indicated in each of the drawings. Further, the "seat width direction" refers to a lateral width direction (left and right direction) of the seat 1, and the "vehicle width direction" refers to a lateral width direction (left and right direction) of a vehicle. Accordingly, the "inner side in the vehicle width direction" refers to the left side of the seat 1, that is, the passenger's seat side (not shown), and the "outer side in the vehicle width direction" refers to the right side of the seat 1, that is, the entrance door side.

Figure 4:
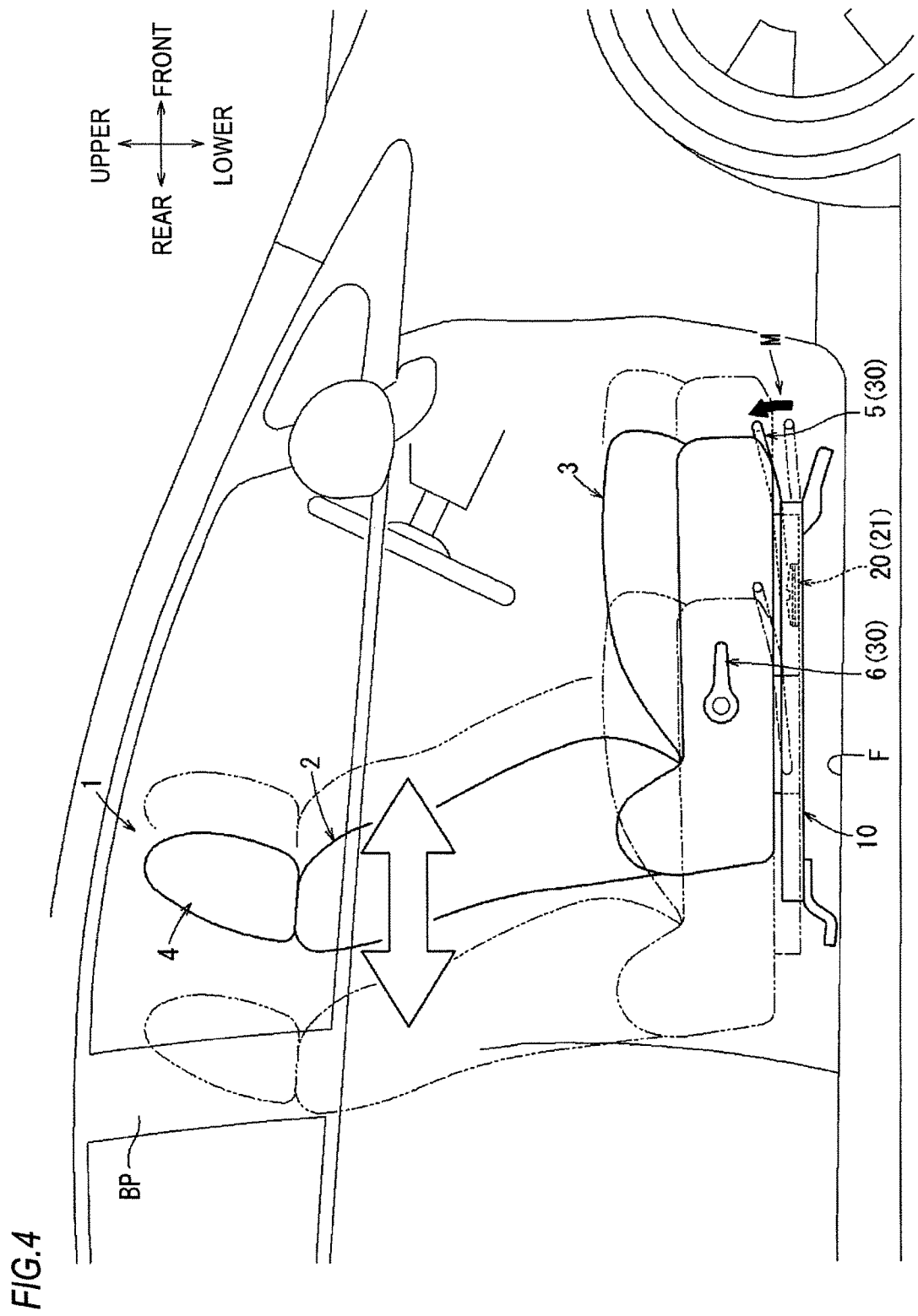
FIG. 4 is a side view showing a situation in which the seat position is adjusted by operating the loop handle.

In an initial state, the above-described seat 1 is maintained in a state where the sliding of each of the above-described slide rails 10 is locked by being biased and the position (hereinafter, referred to as the "seat position") of the seat in the front and rear direction on the floor F is fixed. As shown in FIG. 4, the locked state of the sliding of each of the above-described slide rails 10 is simultaneously released by a user's operation of pulling up a loop handle 5 provided at a front lower portion of the seat cushion 3. In this way, each of the above-described slide rails 10 can be switched to a state in which the seat position can be adjusted in the front and rear direction. Then, each slide rail 10 is returned to a state in which the sliding is locked again at that position by returning the operation of the loop handle 5 after the adjustment of the seat position. Here, the loop handle 5 corresponds to the "release operation member" in the disclosure.

Further, as shown in FIG. 1, the locked state of the sliding of each of the above-described slide rails 10 is simultaneously released also by a user's operation of pulling up a memory lever 6 provided at an outer (right) side portion of the seat cushion 3 in the vehicle width direction (circled number 1). However, at that time, even when the seat position is pulled down to the rear side while maintaining the operation state of the memory lever 6, by an action of an operation mechanism 30 included in the slide rail device M (to be described later), each slide rail 10 can be lowered only to an entrance support position in the vicinity of the rearmost where the seat back 2 substantially overlaps with a B pillar BP of a vehicle in the front and rear direction (circled number 2). Specifically, the movement of each of the above-described slide rails 10 is locked by lowering the seat position to the entrance support position in the vicinity of the rearmost described above. Further, each of the above-described slide rails 10 is switched to a slide locked state at that position by releasing the operation of the memory lever 6 in that position. Therefore, the seat position is pulled down to the rear side while the operation state of the memory lever 6 is maintained, and the movement of the seat position is stopped. With this configuration, it is possible for a user to recognize that the seat position reaches the entrance support position and a wide entrance space is secured. Here, the above-described memory lever 6 corresponds to the "memory operation member" in the disclosure.

Figure 2:
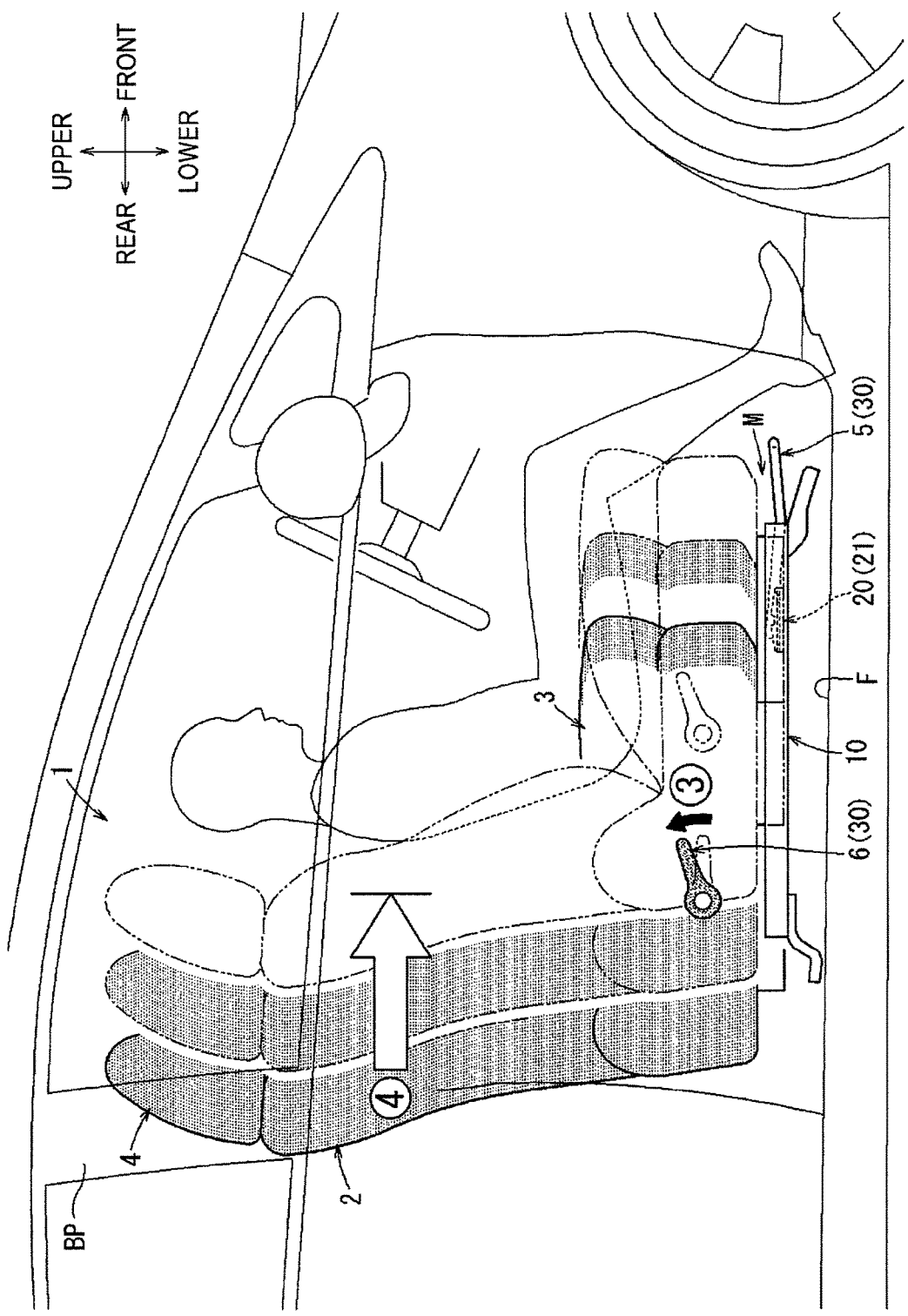
FIG. 2 is a side view showing a procedure for returning a seat position from an entrance support position to a default position.

Further, as shown in FIG. 2, the slide locked state of each of the above-described slide rails 10 is simultaneously released again by a user's operation of pulling up the memory lever 6 again from the state in which the seat position is lowered to the entrance support position in the vicinity of the rearmost as described above (circled number 3). Then, as the seat position is moved forward while maintaining the operation state of the memory lever 6 described above, by an action of the operation mechanism 30 included in the slide rail device M (to be described later), each of the slide rails 10 is switched to the slide locked state at the place where it reaches the position before the seat position is changed, that is, the position at the time when the memory lever 6 shown in FIG. 1 is first operated (circled number 4). Therefore, as a person, who sits on the seat 1 at the entrance support position described above, operates the memory lever 6 to move the seat position toward the front side, the seat position can be immediately returned to a default position (which is the seat position before change) by the operation of the memory lever 6 and returned to a state locked to that position.

Figure 3:
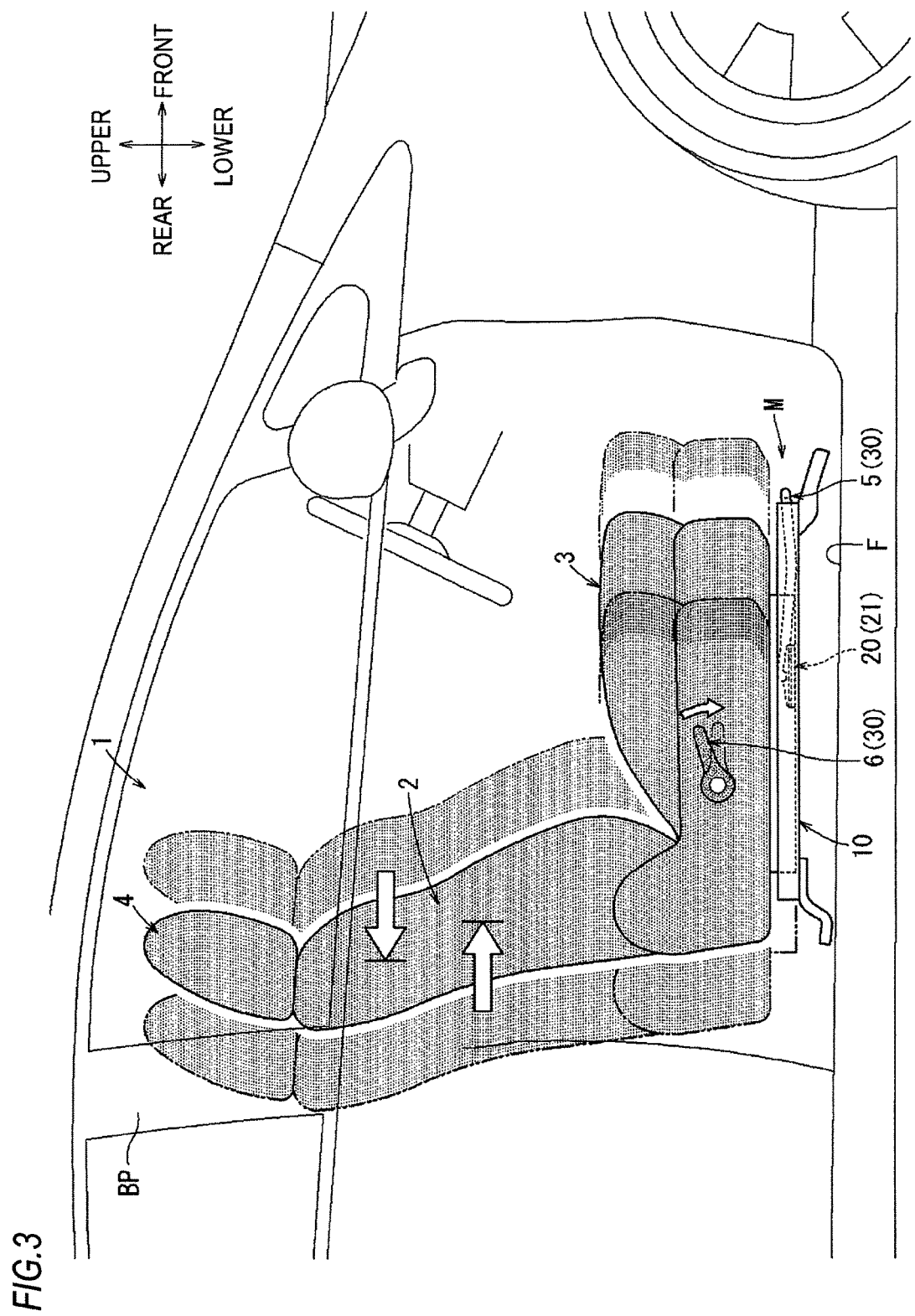
FIG. 3 is a side view showing a state in which sliding is locked by operating a loop handle after operating a memory lever.

Further, as shown in FIG. 3, when the operation of the memory lever 6 described above is released at an intermediate position between the default position and the entrance support position described above with reference to FIGS. 1 and 2, each of the above-described slide rails 10 is adapted to be switched to the slide locked state at each released position. Further, by operating the memory lever 6 again at the position where the sliding is locked, each of the slide rails 10 is adapted to be switched again to a state in which the seat position can be freely adjusted between the default position and the entrance support position described above with reference to FIGS. 1 and 2. Then, the above switching allows the seat position to move to the default position described above with reference to FIGS. 1 and 2 while the operation state of the memory lever 6 is maintained, so that the sliding of each of the slide rails 10 is locked at that position.

<Specific Configuration of Slide Rail 10>

Hereinafter, the specific configurations of the slide rail 10, the memory mechanism 20 and the operation mechanism 30 configuring the above-described slide rail device M will be described in detail. First, the configuration of each slide rail 10 will be described with reference to FIGS. 5 and 6. Specifically, each slide rail 10 includes a lower rail 11 attached on the floor F, an upper rail 12 attached to a lower portion of the seat cushion 3 in a state of being slidable in the front and rear direction with respect to the lower rail 11, and a lock spring 13 for locking the slide between both rails 11, 12. Meanwhile, since a basic structure of each slide rail 10 is substantially common on the left and right sides, the details of these configurations will be described with reference to the configuration of the slide rail 10 disposed on the inner side (left side) in the vehicle width direction shown in FIG. 6. Here, the above-described lock spring 13 corresponds to the "lock mechanism" in the disclosure.

Figure 6:
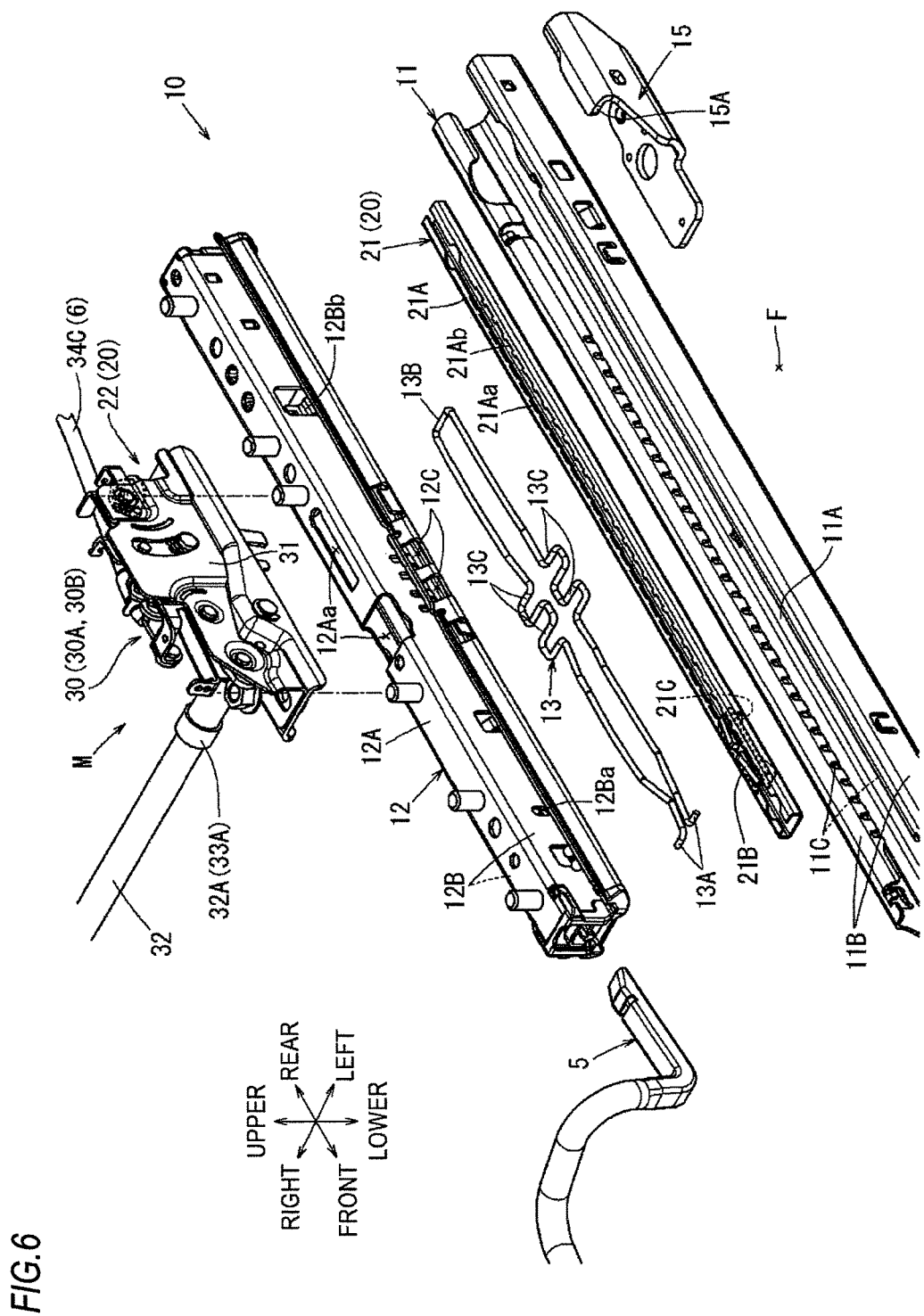
FIG. 6 is an exploded perspective view showing a slide rail on the inner side in a vehicle width direction.

As shown in FIG. 6, the above-described lower rail 11 is formed by bending a single plate material of steel or the like that is elongated in the front and rear direction of a vehicle into a substantially U shape in the width direction. The above-described lower rail 11 is fixed in a state where end portions on the front and rear sides thereof are integrally fastened on the floor F by a fastening member such as a bolt (not shown), respectively. The above-described lower rail 11 is formed in a rail shape whose transverse sectional shape is substantially uniform in the front and rear direction.

Specifically, the above-described lower rail 11 is formed in a transverse sectional shape which includes a bottom surface portion 11A set on the floor F with its surface facing upward, and a pair of left and right lower-side fin parts 11B extending upward from both left and right portions of the bottom surface portion 11A and extending to be folded back in an inverted U shape to face each other inwardly. The lower rail 11 is set in a state where end portions on the front and rear sides of the above-described bottom surface portion 11A are respectively brought into surface contact on the floor F from the upper side. Then, the lower rail 11 is integrally fastened on the floor F by a fastening member such as a bolt (not shown) inserted from the upper side.

On the left and right lower-side fin parts 11B of the above-described lower rail 11, lock grooves 11C with which corresponding lock portions 13C of the lock spring 13 (to be described later) can respectively enter and engage from the lower side are formed at edge portions of the fin portions folded back in the inverted U shape. A plurality of lock grooves 11C are respectively formed side by side at equal intervals in the front and rear direction in a shape that is opened downward along edge portions of the lower-side fin parts 11B folded back inward and suspended. The lock grooves 11C formed in these lower-side fin parts 11B are provided side by side at bilaterally symmetrical positions.

Similar to the above-described lower rail 11, the upper rail 12 is formed by bending a single plate material of steel or the like that is elongated in the front and rear direction of a vehicle into a substantially Ω shape in the width direction. By being inserted into the lower rail 11 from an opening end portion on either side in the longitudinal direction of the above-described lower rail 11, the above-described upper rail 12 is assembled in a state of being slidable in the longitudinal direction with respect to the lower rail 11. Specifically, the upper rail 12 is formed in a transverse sectional shape which includes a top plate portion 12A attached to a lower portion of the above-described seat cushion 3 with its surface facing upward, and a pair of left and right upper-side fin parts 12B extending downward from both left and right portions of the top plate portion 12A and extending to be folded back in a U shape to face outwardly in opposite directions.

The above-described upper rail 12 is assembled by being inserted in the longitudinal direction with respect to the above-described lower rail 11 in such a way that the edge shapes of the left and right upper-side fin parts 12B of the upper rail 12 folded back into the U shape respectively are hooked into the portions of the left and right lower-side fin parts 11B of the lower rail 11 folded back into the inverted U shape. By being assembled in this way, the upper rail 12 is assembled to the lower rail 11 in a state where it is prevented from being respectively detached in the height direction and the seat width direction with respect to the lower rail 11 by engagement between the left and right upper-side fin parts 12B and the left and right lower-side fin parts 11B described above. Specifically, the above-described upper rail 12 is assembled to the lower rail 11 via a resin shoe (not shown) and a steel ball (rolling body, not shown) assembled between the lower rail 11 and the upper rail 12 in a state where it can smoothly slide in the front and rear direction while suppressing the rattling in the height direction and the seat width direction.

The lock spring 13 is formed by bending a single plate material of steel or the like that is elongated in the front and rear direction into a substantially U shape in a plan view. In the above-described lock spring 13, a rear end portion 13B is formed as a folded-back portion which is folded-back to the front side in a substantially U shape in a plan view. Further, the lock spring 13 is configured such that the lock portions 13C bent so as to protrude in a wavy shape toward the outer side in the seat width direction respectively are formed at intermediate portions of a pair of left and right line parts extending from the folded-back rear end portion 13B to the front side. Further, front end portions 13A of the line parts of the lock spring 13 are respectively bent in a shape protruding to the outer side in the seat width direction.

The above-described lock spring 13 is set as a state of being rotatably pin-connected in such a way that each of portions of the front end portions 13A of the above-described line parts bent to the outer side in the seat width direction is inserted, from the inner side, into each of through-holes 12Ba formed in upright wall portions of the front regions of the upper-side fin parts 12B of the above-described upper rail 12 while being elastically pushed and narrowed. Further, the above-described lock spring 13 is set as a state of being rotatably pin-connected in such a way that each of folded-back portions on both corner sides of the above-described rear end portion 13B is hooked, from the upper side, to each of hook pieces 12Bb formed by being cut and raised inward from upright wall portions of the rear regions of the upper-side fin parts 12B of the above-described upper rail 12.

Further, the above-described lock spring 13 is assembled in a state where each of the left and right lock portions 13C described above is, from the inner side, passed into each of through-grooves 12C formed in upright wall portions of the central regions in the front and rear direction of the left and right upper-side fin parts 12B of the above-described upper rail 12 and penetrating in the seat width direction while being elastically pushed and narrowed. Each of the though-grooves 12C described above has a comb-like slit through which each of the lock portions 13C of the lock spring 13 passed through each of the through-grooves 12C can be passed in the upward direction while being elongated. As described above, the lock spring 13 has a both end support structure in which the front end portions 13A and the rear end portion 13B are pin-connected to the upper rail 12 so as to be rotatable in the height direction. Therefore, in the free state of the lock spring 13, each of the lock portions 13C described above is held as a state where it is inserted, from the lower side, into each of the slits elongated in a comb shape in the through-grooves 12C of the upper rail 12 and it is supported from the front and rear sides by the restoring action according to the spring biasing force of the lock spring itself In the above-described lock spring 13, the slits of the through-grooves 12C formed in the upper-side fin part 12B on each side and the lock grooves 11C formed in the lower-side fin part 11B on each side are aligned with each other in the vehicle width direction, so that the slide position in the front and rear direction of the above-described upper rail 12 with respect to the lower rail 11 is adapted to pass across the slits of the through-grooves 12C and the lock grooves 11C from the lower side. As a result, the sliding in the front and rear direction of the upper rail 12 with respect to the lower rail 11 is held in a locked state via the lock portions 13C of the above-described lock spring 13. In each of FIGS. 11, 12, 15, 19 and 23, a state in which the sliding of the above-described upper rail 12 with respect to the lower rail 11 is locked is represented by a state in which the lock portions 13C of the lock spring 13 is inserted into the lock grooves 11C of the lower rail 11 from the lower side.

Figure 11:
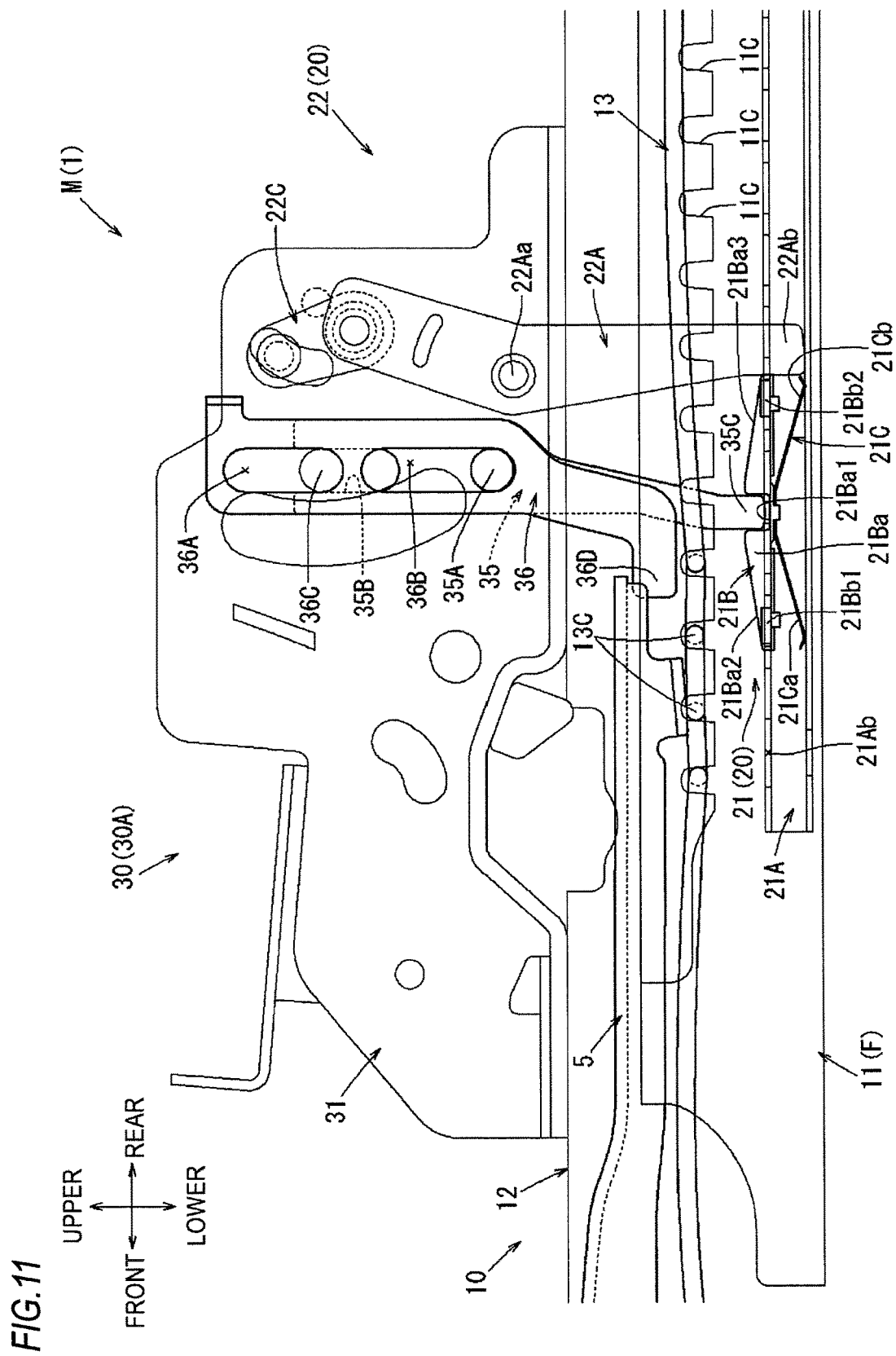
FIG. 11 is a side view visualizing a main mechanical component on the front side of the vehicle slide rail device in an initial state.
Figure 15:
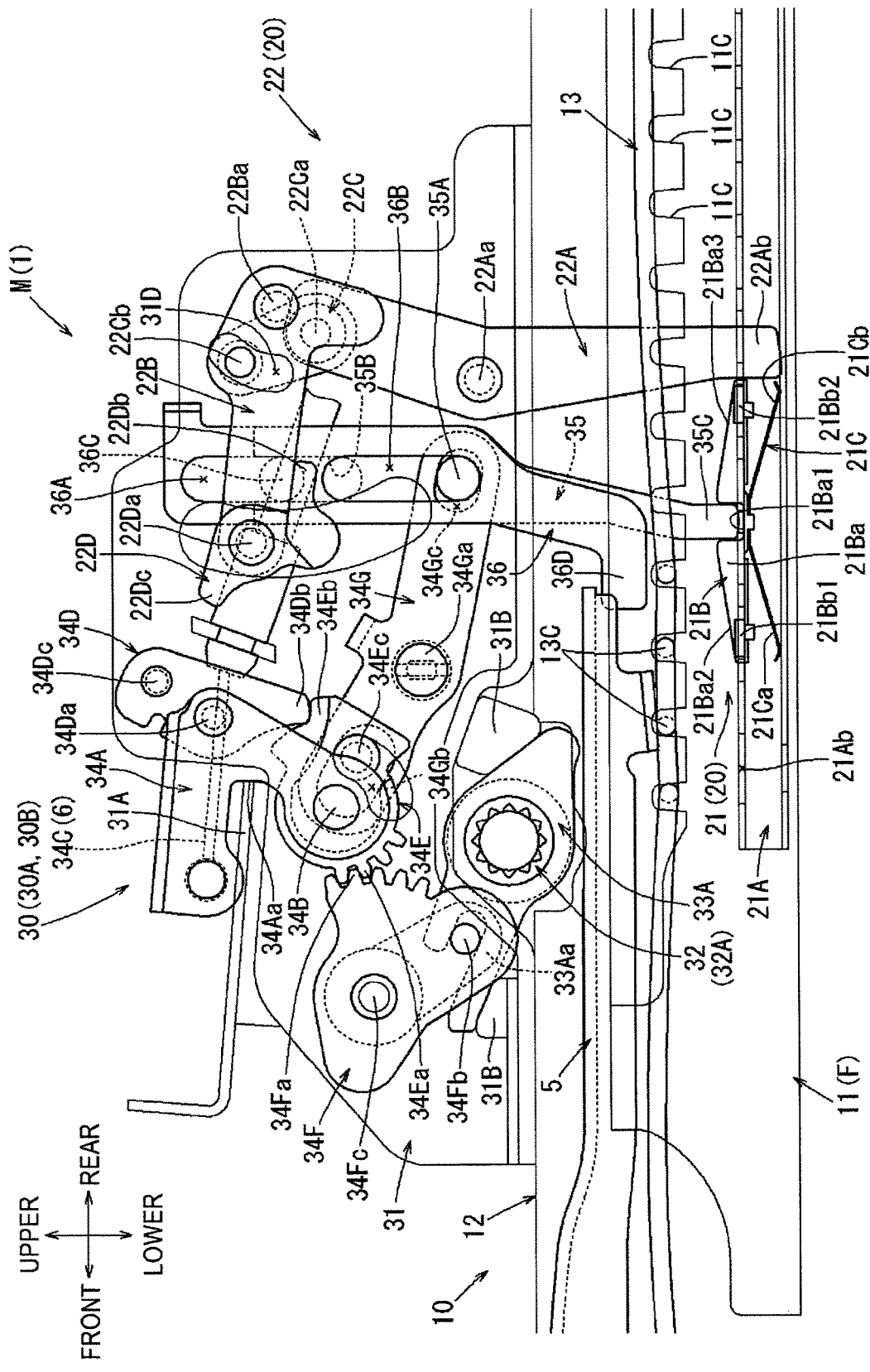
FIG. 15 is a side view visualizing a main mechanical component on the inner side of the vehicle slide rail device in an initial state.

As the above-described loop handle 5 is operated (see FIGS. 11 to 13) or the memory lever 6 is operated (see FIGS. 15 to 17), the lock portions 13C are pushed and bent downward, so that the above-described lock spring 13 can be removed downward from the lock grooves 11C of the lower rail 11. With the above operation, the slide locked state of the upper rail 12 by the lock spring 13 is released, so that the upper rail 12 can slide in the front and rear direction with respect to the lower rail 11. Then, by releasing the operation of the loop handle 5 or the operation of the memory lever 6, the lock spring 13 is returned again to the state (slide locked state) in which it is inserted into the lock grooves 11C of the lower rail 11 by its spring biasing force, as shown in FIGS. 11 and 15.

At that time, as shown in FIG. 28, when the sliding position of the upper rail 12 is in a state where the lock grooves 11C of the lower rail 11 are not provided at positions of the lock portions 13C of the lock spring 13 to be restored, i.e., a state where a shelf surface between the lock grooves 11C is positioned at the positions of the lock portions 13C of the lock spring 13 to be restored, the lock portions 13C are retuned only to the position where they are brought into contact with the shelf surface, and the sliding of the lock portions 13C are not locked. However, by adjusting the position so that the sliding position of the upper rail 12 is shifted back and forth from the sliding position, the lock portions 13C are aligned with the lock grooves 11C of the lower rail 11 and inserted into the lock grooves 11C, thereby locking the slide.

Hereinabove, the specific configuration of each of the slide rails 10 shown in FIG. 5 has been described. Meanwhile, the memory mechanism 20 and the operation mechanism 30 (to be described later) are additionally assembled to one of the slide rails 10, which is disposed on the inner side (left side) in the vehicle width direction. With the above configuration, the unlocking operation of the lock spring 13 in the slide rail 10 on the inner side in the vehicle width direction is performed via the above-described operation mechanism 30 by operating the above-described memory lever 6. On the other hand, in the slide rail 10 on the outer side (right side) in the vehicle width direction, a release arm 33B is disposed on the upper rail 12. The release arm 33B is assembled in a state of being able to receive power transmission via a rod 32 of the operation mechanism 30 (to be described later). With the above configuration, the unlocking operation of the lock spring 13 in the slide rail 10 on the outer side in the vehicle width direction is also synchronously performed via the above-described release arm 33B by operating the above-described memory lever 6.

Further, in the above-described slide rail 10 disposed on the outer side (right side) in the vehicle width direction, a tension spring 14 is additionally hooked between the upper rail 12 and the lower rail 11. With the above configuration, a force in a direction in which the upper rail 12 is pushed and moved toward the front side with respect to the lower rail 11 is normally applied to both of the slide rails 10 by a spring biasing force exerted by the above-described tension spring 14. With the this configuration, the upper rail 12 can slide to the front side with respect to the lower rail 11 with a slight force by releasing the slide locked state of the slide rails 10.

Further, a stopper bracket 15 is attached to the slide rail 10 disposed on the inner side (left side) in the vehicle width direction. The stopper bracket 15 is capable of locking the seat position at the entrance support position (virtual line position in FIG. 1) in the vicinity of the rearmost when the slide rail 10 is slid to the rear side in an unlocked state by the operation of the memory lever 6 described above. As shown in FIGS. 5 and 6, the above-described stopper bracket 15 is formed by bending a plate material of steel or the like into a substantially L shape. The stopper bracket 15 is externally attached to the lower rail 11 so that a bottom plate portion and a standing plate portion are brought into contact with the bottom surface portion 11A and the outer surface portion of the lower-side fin part 11B on the left side of the lower rail 11. The above-described stopper bracket 15 has a locking surface portion 15A which is formed on an upper edge of the standing plate portion so as to protrude outward in the vehicle width direction in a collar shape. As the slide rail 10 on the inner side in the vehicle width direction described above is slid to the rear side in a state where the slide locked state is released, the locking surface portion 15A of the above-described stopper bracket 15 is brought into contact with a base bracket 31 of the operation mechanism 30 (to be described later) from the rear side, thereby locking the movement of the slide rail 10.

<Specific Configuration of Memory Mechanism 20>

Subsequently, a specific configuration of the memory mechanism 20 will be described with reference to FIGS. 5 to 10. As shown in FIGS. 5 and 6, the memory mechanism 20 mainly includes a memory body 21 assembled to the lower rail 11 and a trigger 22 assembled to the upper rail 12. As shown in FIGS. 15 to 19, when the seat position is lowered to the rear side by operating the memory lever 6 described above, the memory body 21 remains at a fixed position on the lower rail 11 and functions as a member for defining the default position of the seat position. When the seat position is lowered to the rear side by operating the above-described memory lever 6 and then is returned again to the default position where the memory body 21 remains as shown in FIGS. 20 to 23, the trigger 22 is rotated by being pressed against the memory body 21 from the rear side and is operated to lock the seat position at that position. Here, the above-described trigger 22 corresponds to the "cancel mechanism" in the disclosure.

<Specific Configuration of Memory Body 21>

Subsequently, a specific configuration of the above-described memory body 21 will be described with reference to FIGS. 6 and 7. The memory body 21 includes a memory rail 21A that is elongated in the front and rear direction, a memory piece 21B that is assembled so as to be slidable in the front and rear direction with respect to the memory rail 21A, and a leaf spring 21C that normally biases the memory piece 21B in an upward direction for engaging with the memory rail 21A. Here, the memory piece 21B corresponds to the "memory member" in the disclosure.

The above-described memory rail 21A has a shape formed by bending a single plate material of steel or the like that is elongated in the front and rear direction into a substantially U shape in the width direction and additionally bending upper edge portions at the bent portions thereof into a collar shape to face each other inwardly. The above-described memory rail 21A is provided so that end portions on the front and rear sides thereof are screwed on the bottom surface portion 11A of the above-described lower rail 11 and are integrally fixed thereto.

By inserting the memory piece 21B from one of front and rear opening end portions of the above-described memory rail 21A into the inside of the memory rail, the memory rail 21A is assembled in a state of guiding the memory piece 21B in the front and rear direction so that the memory piece 21B slides so as not to be released in the height direction. Specifically, since the memory piece 21B is assembled to the inside of the above-described memory rail 21A, the memory rail 21A guides the memory piece 21B so as to slide in the front and rear direction in a state where a head portion 21B*a* of the memory piece 21B protrudes upward from a slit-like guide hole 21A*a* opening between both top plate portions protruding in a collar shape.

On inner edge portions facing the guide hole 21A*a* of both top plate portions of the above-described memory rail 21A protruding in a collar shape, a plurality of rectangular memory grooves 21A*b* are formed side by side at equal intervals in the front and rear direction. Each memory groove 21A*b* is opened such that the hole shape of the guide hole 21A*a* is partially expanded in the vehicle width direction. As memory teeth 21B*b*1, 21B*b*2 on the front and rear sides of the memory piece 21B assembled in the memory rail 21A are respectively fitted into the memory grooves 21A*b* from the lower side, these memory grooves 21A*b* function to maintain the memory piece 21B in a state of restricting the sliding in the front and rear direction of the memory piece 21B.

Figure 7:
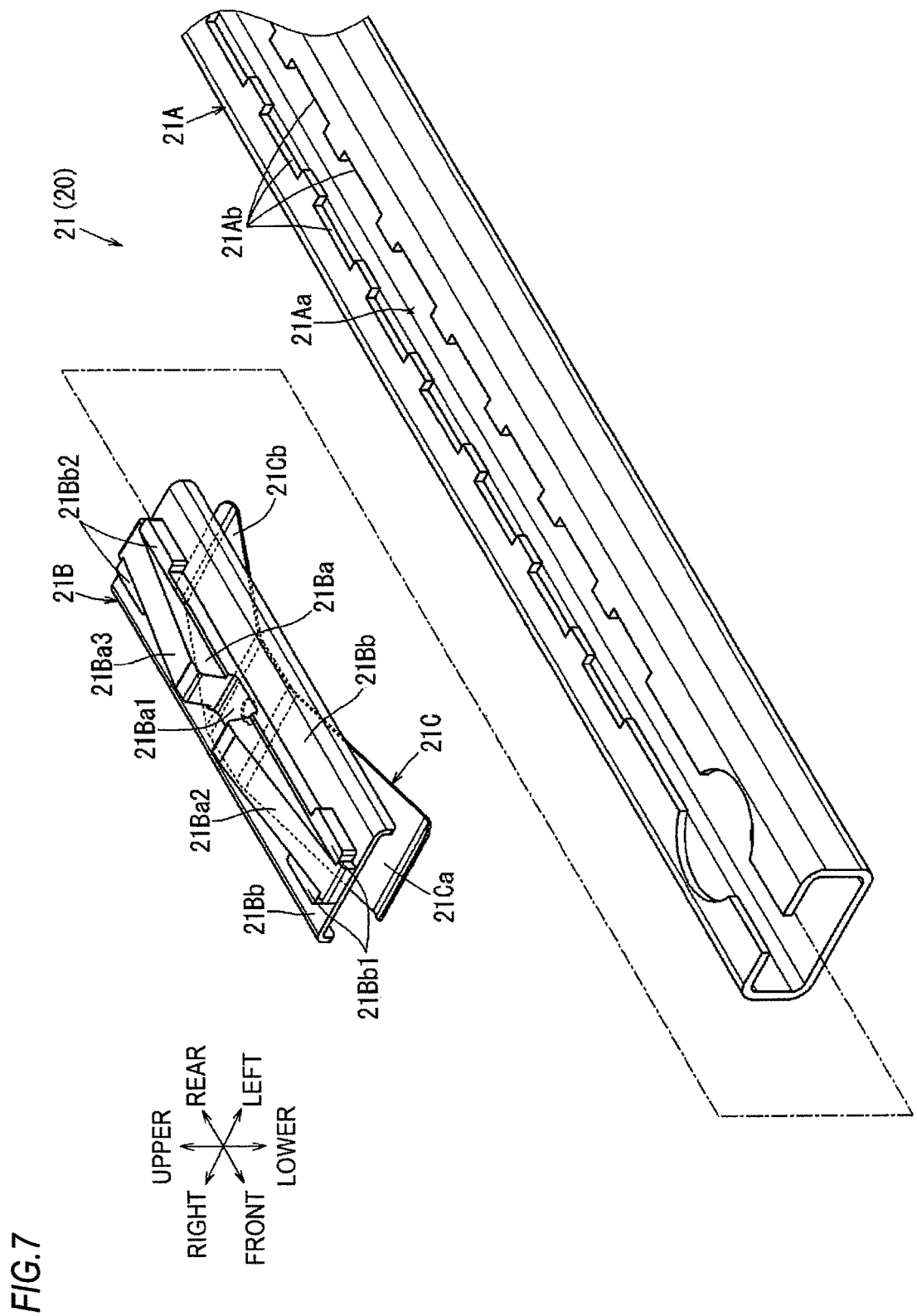
FIG. 7 is an exploded perspective view of a memory body.

As shown in FIG. 7, the memory piece 21B is configured to include a pedestal-shaped head portion 21B*a* elongated in the front and rear direction and flange pieces 21B*b* each protruding in the front and rear direction from a base of the head portion 21B*a*. By being inserted into the above-described memory rail 21A from one of the front and rear opening end portions, the above-described memory piece 21B is assembled as a state in which the head portion 21B*a* protrudes upward from the guide hole 21A*a* of the memory rail 21A and each flange piece 21B*b* protrudes to be positioned directly below the both top plate portions of the memory piece 21B (see FIG. 6). With the above assembly, by the protruding of each flange piece 21B*b* described above, the memory piece 21B is provided as a state of being guided so as to be straightly slidable in the front and rear direction without being released in the height direction with respect to the memory rail 21A.

As shown in FIG. 7, the memory teeth 21B*b*1, 21B*b*2 protruding in a substantially rectangular shape toward the upper side are formed at end portions on the front and rear sides of the flange pieces 21B*b* of the above-described memory piece 21B, respectively. As shown in FIG. 6, when the slide position of the above-described memory piece 21B in the memory rail 21A is set to each position corresponding to a position where the sliding of the above-described slide rail 10 is locked, the memory piece 21B is pulled upward by a biasing force of the leaf spring 21C, and thus, these memory teeth 21B*b*1, 21B*b*2 are fitted into the memory grooves 21A*b* of the above-described memory rail 21A from the lower side, thereby restricting the sliding of the memory piece 21B in the front and rear direction. Specifically, the memory teeth 21B*b*1 on the front side are fitted to be brought into contact with the front surface in each memory groove 21A*b*, and the memory teeth 21B*b*2 on the rear side are fitted to be brought into contact with the rear surface in each memory grooves 21A*b*.

Figure 12:
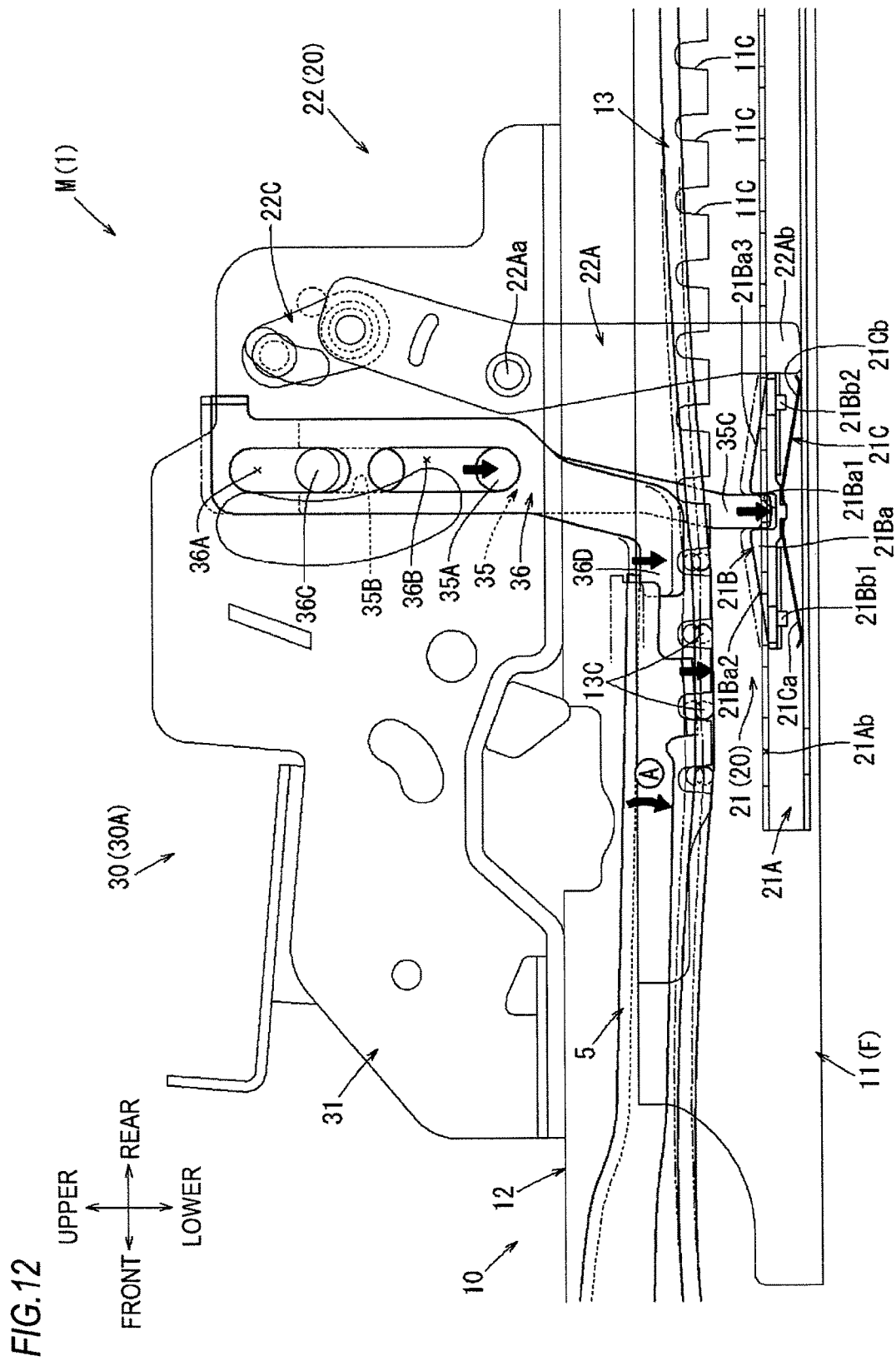
FIG. 12 is a side view showing a state in which a memory piece is removed from a state of defining the default position by a memory release member by operating the loop handle from the initial state shown in FIG. 11.
Figure 13:
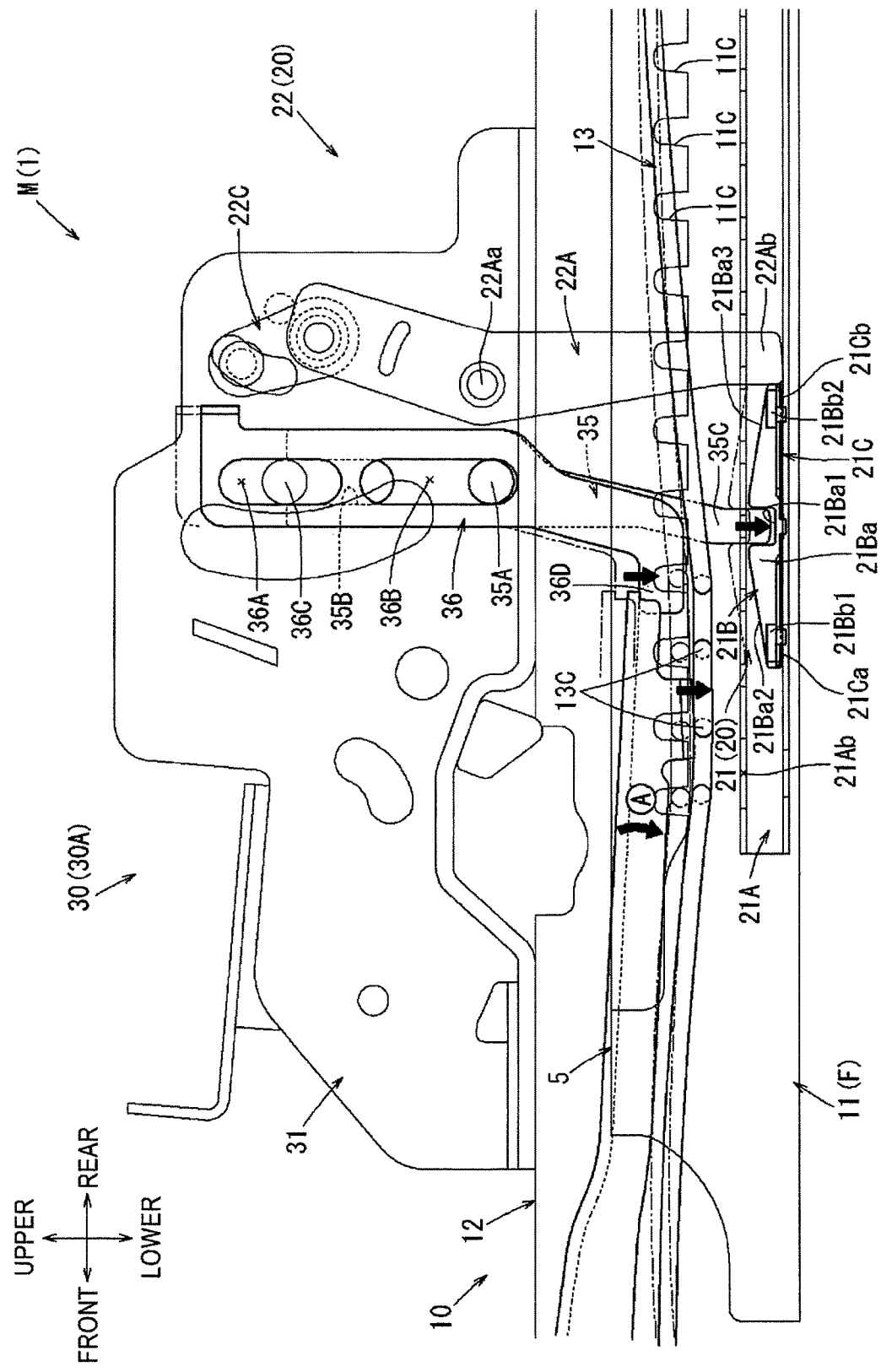
FIG. 13 is a side view showing a state in which a slide lock is released by further operating the loop handle.

Further, in the head portion 21B*a* of the above-described memory piece 21B, a top surface has a shape bulging in a substantially mountain shape in a side view, a concave surface portion 21B*a*1 recessed in a funnel shape is formed at an apex portion of the mountain at the center in the front and rear direction, and inclined surfaces 21B*a*2, 21B*a*3 are formed so as to fall obliquely forward and backward from the concave surface portion 21B*a*1. As shown in FIG. 11, a leg piece 35C on the lower end side of the memory link 35 of the operation mechanism 30 (to be described later) is normally set in a state of being shallowly fitted into the above-described concave surface portion 21B*a*1. As shown in FIGS. 12 and 13, by operating the above-described loop handle 5, the concave surface portion 21B*a*1 is pressed downward by the leg piece 35C on the lower end side of the memory link 35 pushed downward according to the operation of the loop handle 5. With this pressing, the memory piece 21B is pushed downward against a biasing force of the leaf spring 21C, and the memory teeth 21B*b*1, 21B*b*2 are removed from the memory grooves 21A*b* of the memory rail 21A, so that the memory piece 21B is released from the position restriction state.

As shown in FIGS. 7 and 11, the leaf spring 21C is bent in a substantially truncated mountain shape in a side view, and a top plate portion of the leaf spring 21C is integrally attached to a bottom surface portion of the above-described memory piece 21B. With the above attachment, when the memory piece 21B is assembled in the memory rail 21A, the leaf spring 21C is provided in a state where a front leg 21C*a* and a rear leg 21C*b* extending downward from the bottom surface portion of the memory piece 21B are respectively pressed against the bottom surface portion of the memory rail 21A. Thus, the leaf spring 21C normally applies an upward biasing force for fitting the memory piece 21B into each memory groove 21A*b* of the memory rail 21A.

The front leg 21C*a* of the above-described leaf spring 21C extends obliquely forward and downward from the region directly below the inclined surface 21B*a*2 on the front side of the memory piece 21B, and the rear leg 21C*b* of the leaf spring 21C extends obliquely rearward and downward from the region directly below the inclined surface 21B*a*3 on the rear side of the memory piece 21B. With the leaf spring 21C having the above configuration, the memory piece 21B is spring-biased upward with respect to the memory rail 21A in a well-balanced manner with a wide front-rear width by the front leg 21C*a* and the rear leg 21C*b* described above. Thus, the memory piece 21B is straightly fitted into each memory groove 21A*b* from the lower side without being tilted back and forth or is pushed downward by the leg piece 35C of the memory link 35.

Figure 24:
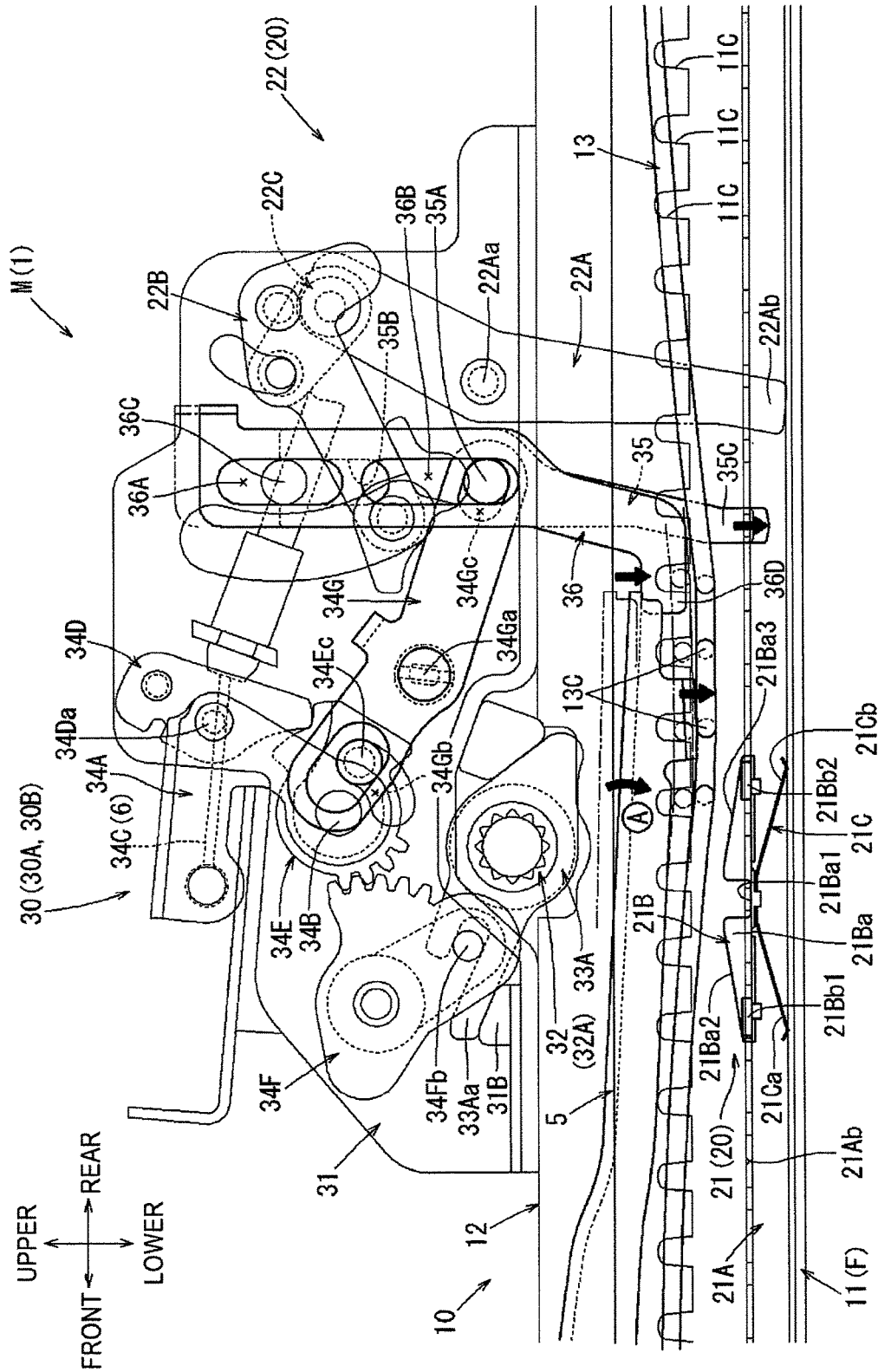
FIG. 24 is a side view showing a state in which the slide lock is released by operating the loop handle at the retracted position shown in FIG. 19.
Figure 25:
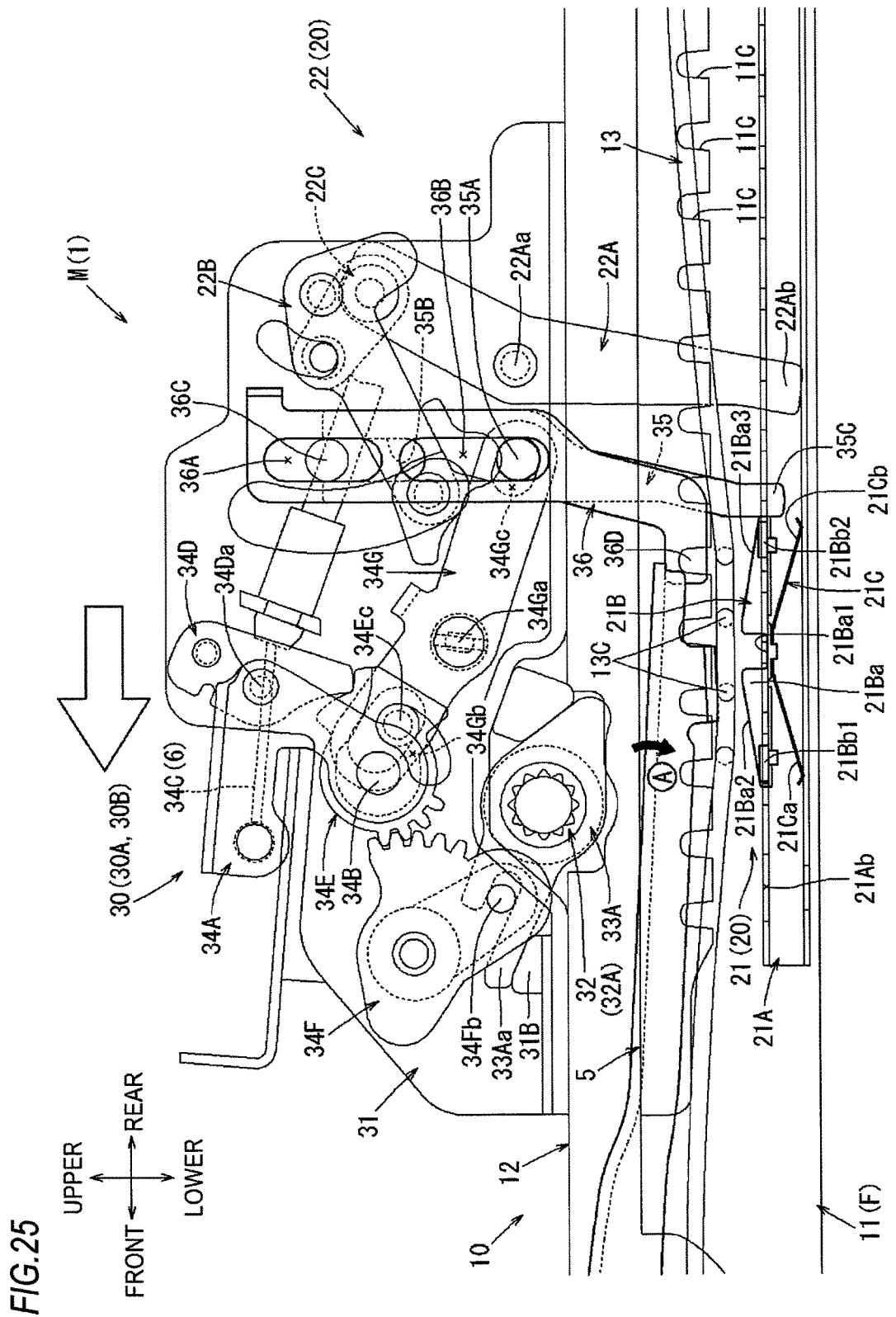
FIG. 25 is a side view showing a state in which the memory release member is brought into contact with the memory piece by moving the seat position forward in the operated state.
Figure 26:
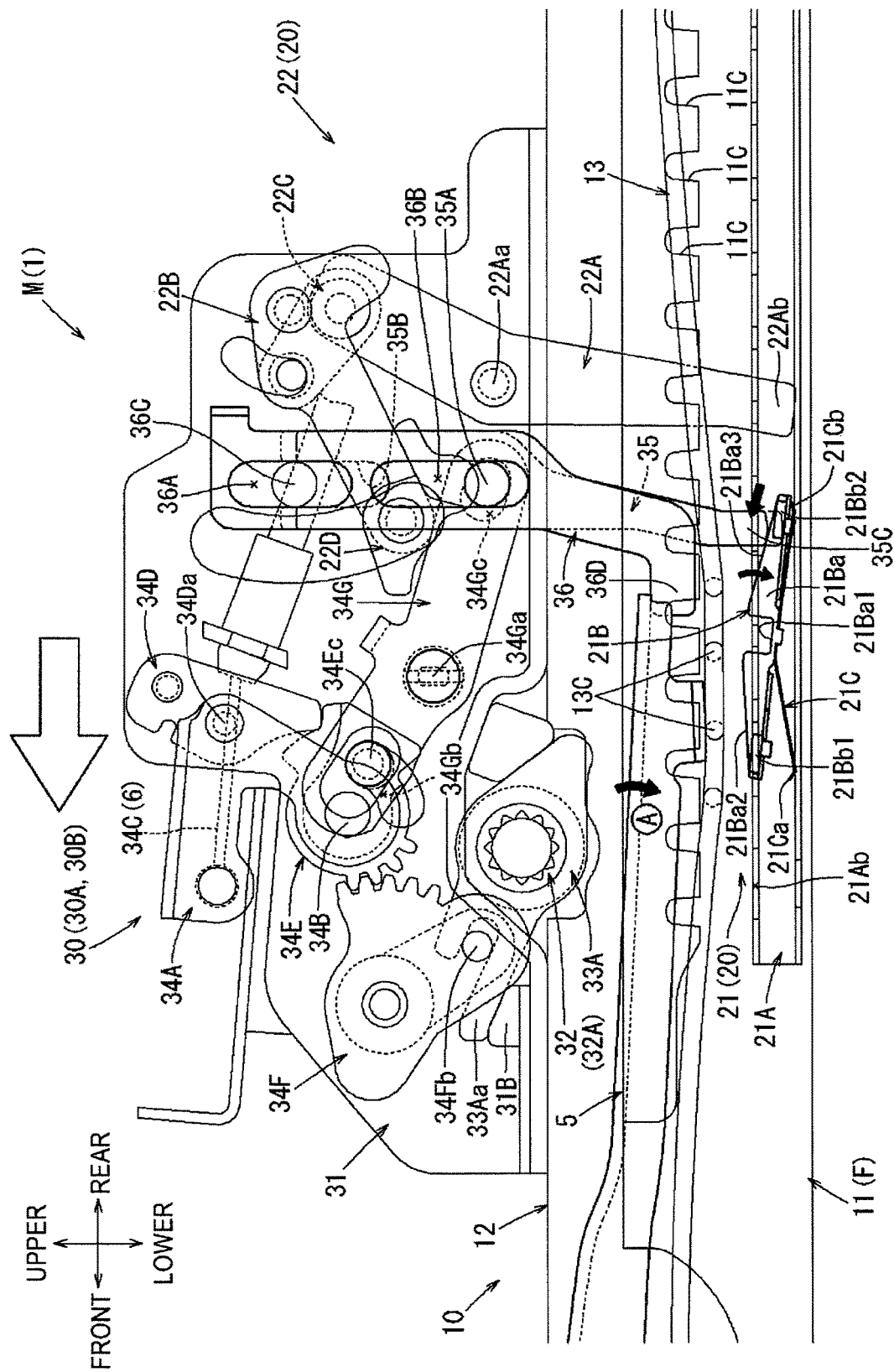
FIG. 26 is a side view showing a state in which the memory release member is moved forward while pushing and tilting the memory piece by further moving the seat position forward.
Figure 27:
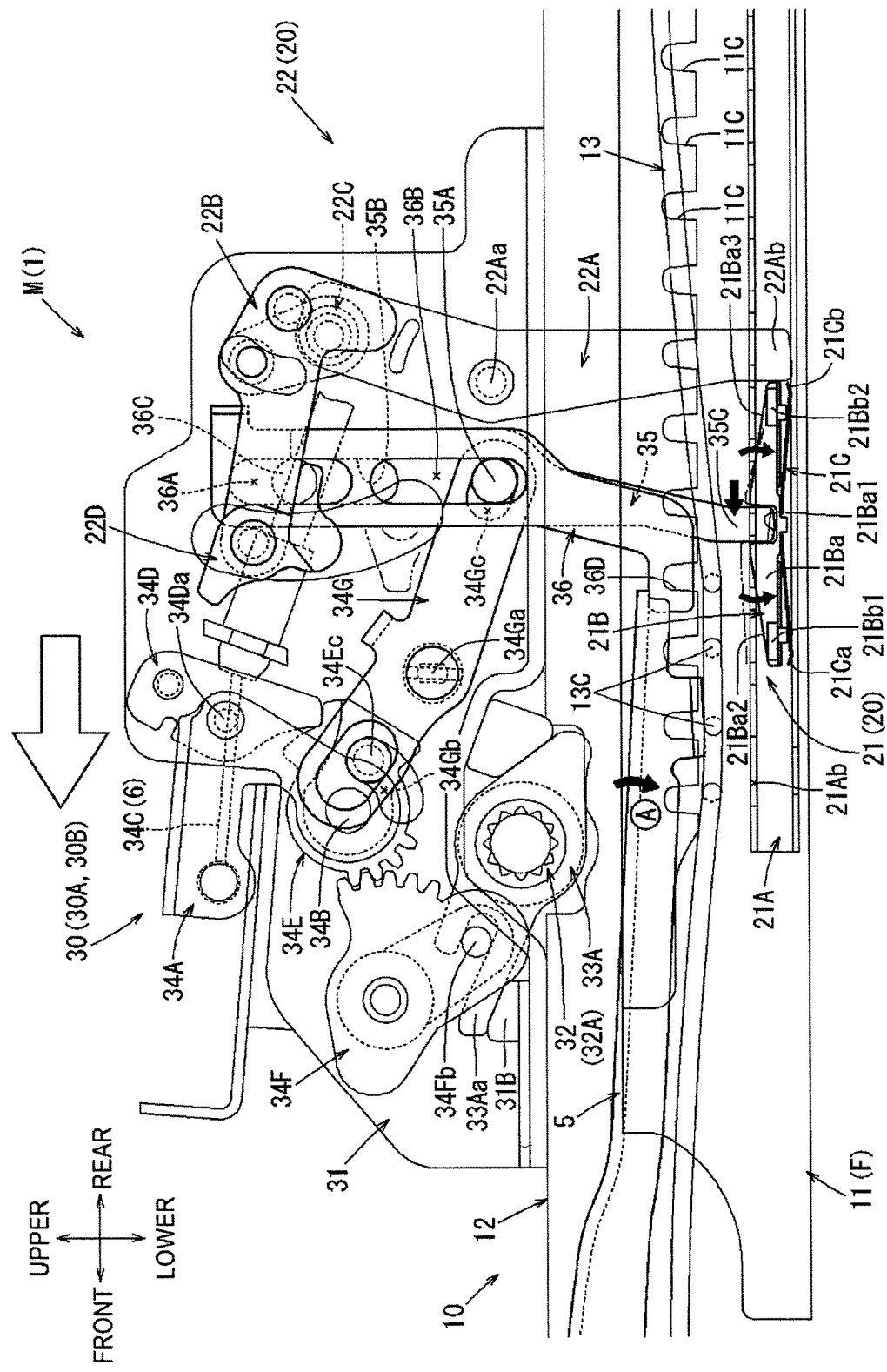
FIG. 27 is a side view showing a state in which the memory release member is returned to an engagement state with the memory piece by further moving the seat position forward.

When the above-described memory link 35 is pushed down by the operation of the loop handle 5 at the position deviated rearward from the position directly above the memory piece 21B as shown in FIG. 24 and is further moved from the rear side toward the memory piece 21B as shown in FIG. 25 while maintaining the operation state in which the memory link 35 is pushed down, the above-described memory piece 21B is configured so that the leg piece 35C of the memory link 35 can ride on the inclined surface 21B*a*3 on the rear side as shown in FIG. 26 and can be inserted into the concave surface portion 21B*a*1 as shown in FIG. 27.

Specifically, as shown in FIG. 25, when the leg piece 35C of the member link 35 is brought into contact with the memory piece 21B from the rear side while maintaining the operated state in which the leg piece 35C of the member link 35 is pushed down as described above, a rear end portion of the memory piece 21B receives a pressing force so as to be pushed forward and downward by the leg piece 35C of the member link 35. In this way, the memory piece 21B is in a rearwardly tilted posture where the memory piece 21B elastically pushes the rear leg 21C*b* of the leaf spring 21C downward as shown in FIG. 26, and the leg piece 35C of the member link 35 rides on the inclined surface 21B*a*3 on the rear side. At that time, the memory teeth 21B*b*2 on the rear side of the memory piece 21B are removed downward from the corresponding memory grooves 21A*b* of the memory rail 21A in accordance with the above rearward tilting, but the memory teeth 21B*b*1 on the front side are maintained in a state of being fitted into the corresponding memory grooves 21A*b*. Therefore, the memory piece 21B is still maintained in the positional restricted state.

Figure 14:
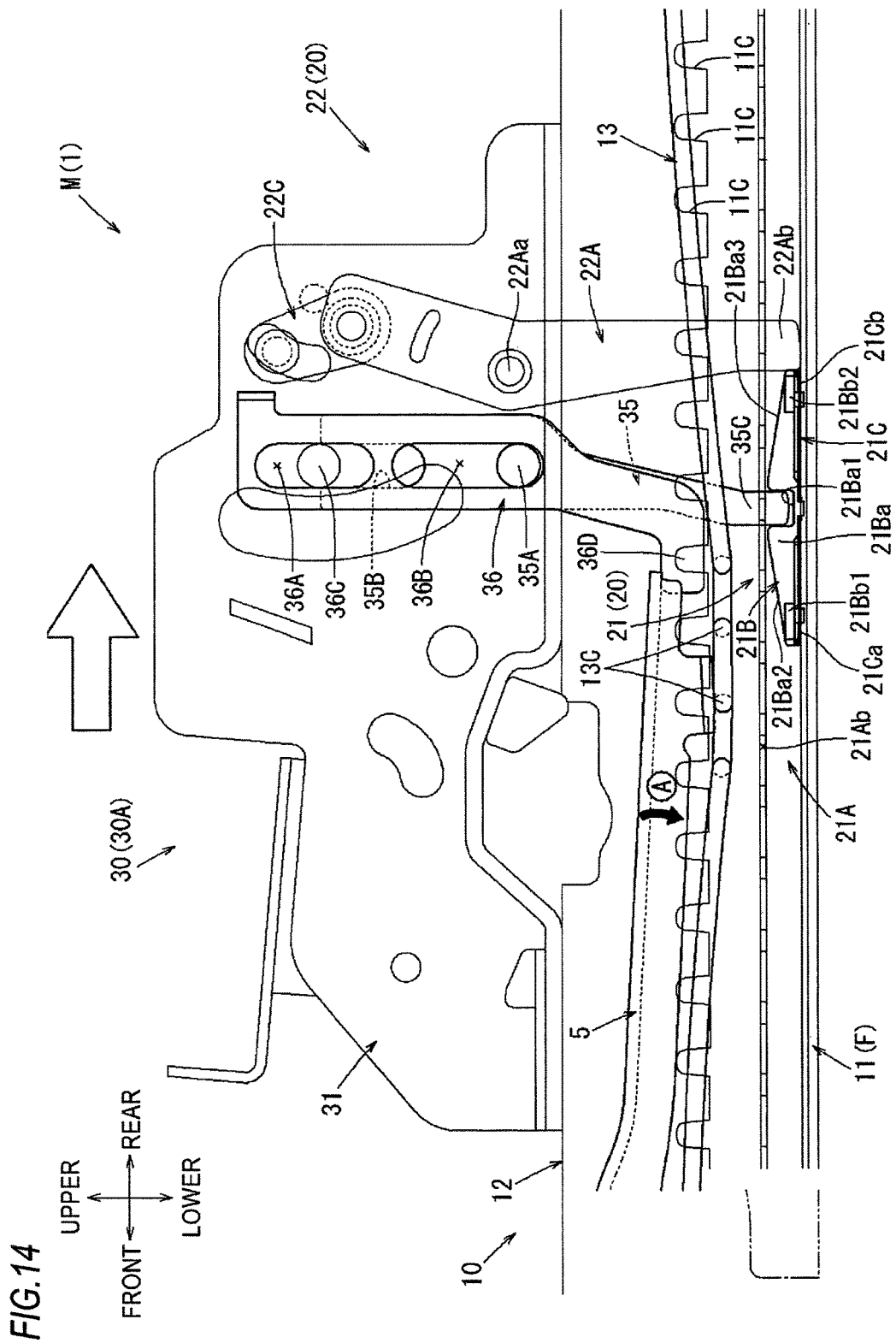
FIG. 14 is a side view showing a state in which the seat position is retracted in an operation state of the loop handle.

Further, as the memory link 35 is further moved forward from the above state while maintaining the operated state in which it is pushed down, as shown in FIG. 27, the leg piece 35C of the member link 35 reaches and enters the concave surface portion 21B*a*1 of the memory piece 21B. Further, as in the state described above with reference to FIG. 13, the memory link 35 straightly pushes the memory piece 21B downward, so that both of the memory teeth 21B*b*1, 21B*b*2 on the front and rear sides are removed from the memory grooves 21A*b* of the memory rail 21A. In this way, the memory piece 21B moves together with the memory link 35 in the front and rear direction, and, as shown in FIG. 14, the memory piece 21B moves in the front and rear direction in conjunction with the movement in the front and rear direction of the memory link 35 while maintaining the operated state in which the memory link 35 is pushed down.

Then, the leg piece 35C of the memory link 35 is pulled upward by returning the operation of the loop handle 5 after the memory piece 21B moves together with the memory link 35. Thereby, as in the state shown in FIG. 11, at that position, the memory piece 21B is again fitted into each of the memory grooves 21A*b* of the memory rail 21A by a biasing force of the leaf spring 21C and is returned to a state in which the position of the memory piece 21B is restricted. Through the above series of operations, the maintaining position of the memory piece 21B is displaced to a position corresponding to the moving position of the seat 1 in accordance with the operation of the loop handle 5.

<Specific Configuration of Trigger 22>

Subsequently, a specific configuration of the above-described trigger 22 will be described with reference to FIGS. 8 to 10 and 15. The trigger 22 is assembled on a base bracket 31 of the operation mechanism 30 (to be described later) which is assembled on the upper rail 12 of the above-described slide rail 10. Specifically, the trigger 22 includes a detection link 22A, a cancel link 22B, a connection link 22C, and a kick member 22D. The detection link 22A is rotatably pin-connected to the above-described base bracket 31 by a shaft pin 22A*a* having an axis oriented in the vehicle width direction. The cancel link 22B is rotatably pin-connected to a position of the base bracket 31 higher than the setting position of the shaft pin 22A*a* of the detection link 22A by a shaft pin 22B*a* having an axis oriented in the vehicle width direction. The connection link 22C is rotatably pin-connected to an upper end portion of the detection link 22A and an intermediate portion on the root side close to the shaft pin 22B*a* of the cancel link 22B by connection pins 22C*a*, 22C*b* each having an axis oriented in the vehicle width direction. The kick member 22D is rotatably pin-connected to a leading end portion of the cancel link 22B by a shaft pin 22D*a* having an axis oriented in the vehicle width direction.

The above-described detection link 22A is formed of a single plate material of steel or the like that is cut into a shape elongated in the height direction. An intermediate portion in the height direction of the detection link 22A is rotatably pin-connected to the base bracket 31 by the above-described shaft pin 22A*a*. Further, the detection link 22A is set in a state where a vertical side portion extending downward from the connection portion of the shaft pin 22A passes through a through-hole 12A*a* formed in the top plate portion 12A7 of the above-described upper rail 12 from the upper side and enters the inside of the upper rail 12. In the detection link 22A, a leg piece 22A*b* is formed on a lower end portion of the vertical side portion entering the inside of the upper rail 12. The leg piece 22A*b* is brought into contact with the above-described memory piece 21B from the rear side to detect the movement thereof.

Figure 17:
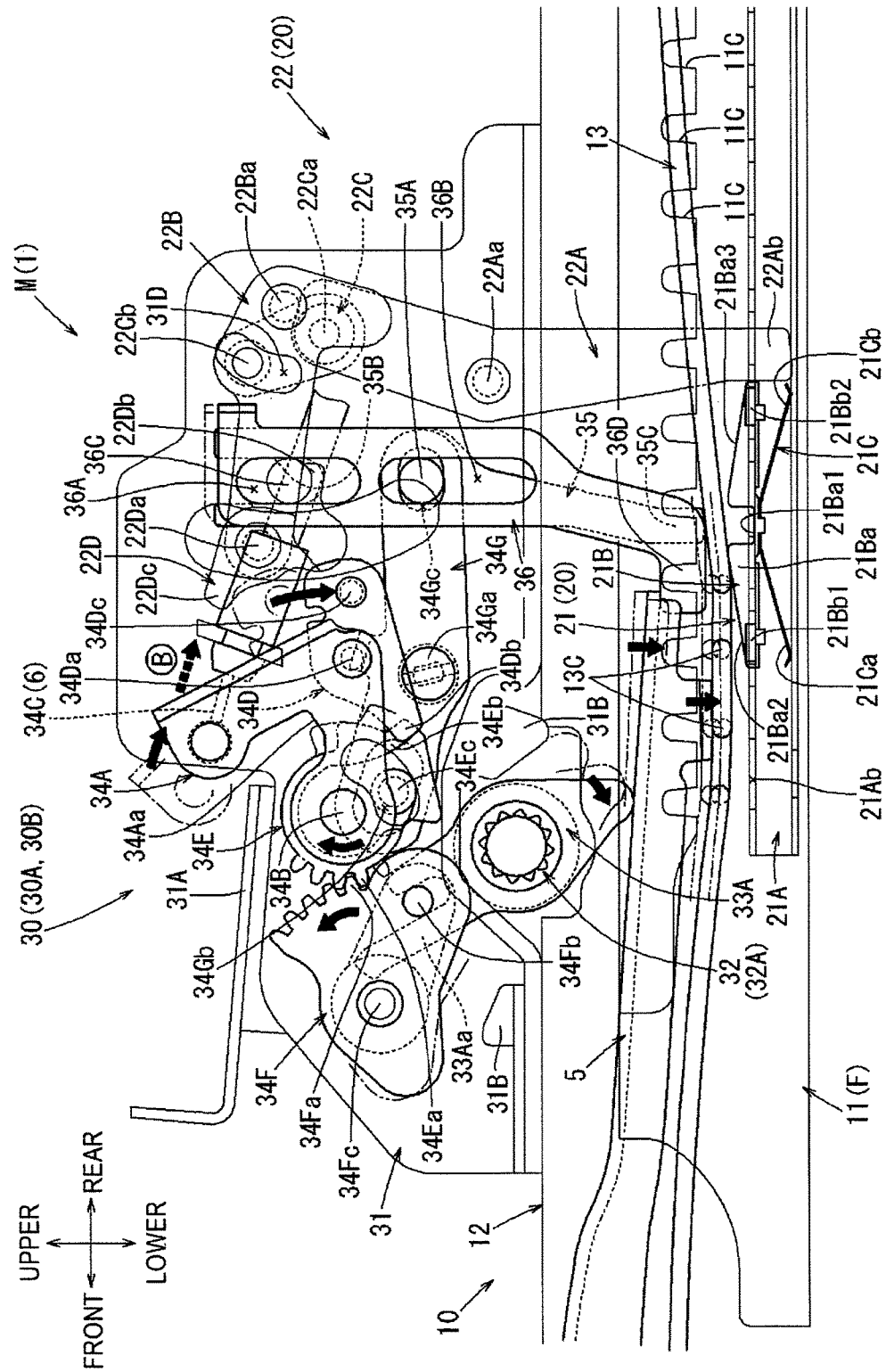
FIG. 17 is a side view showing a state in which the memory lever is further operated to an overstroke position.
Figure 18:
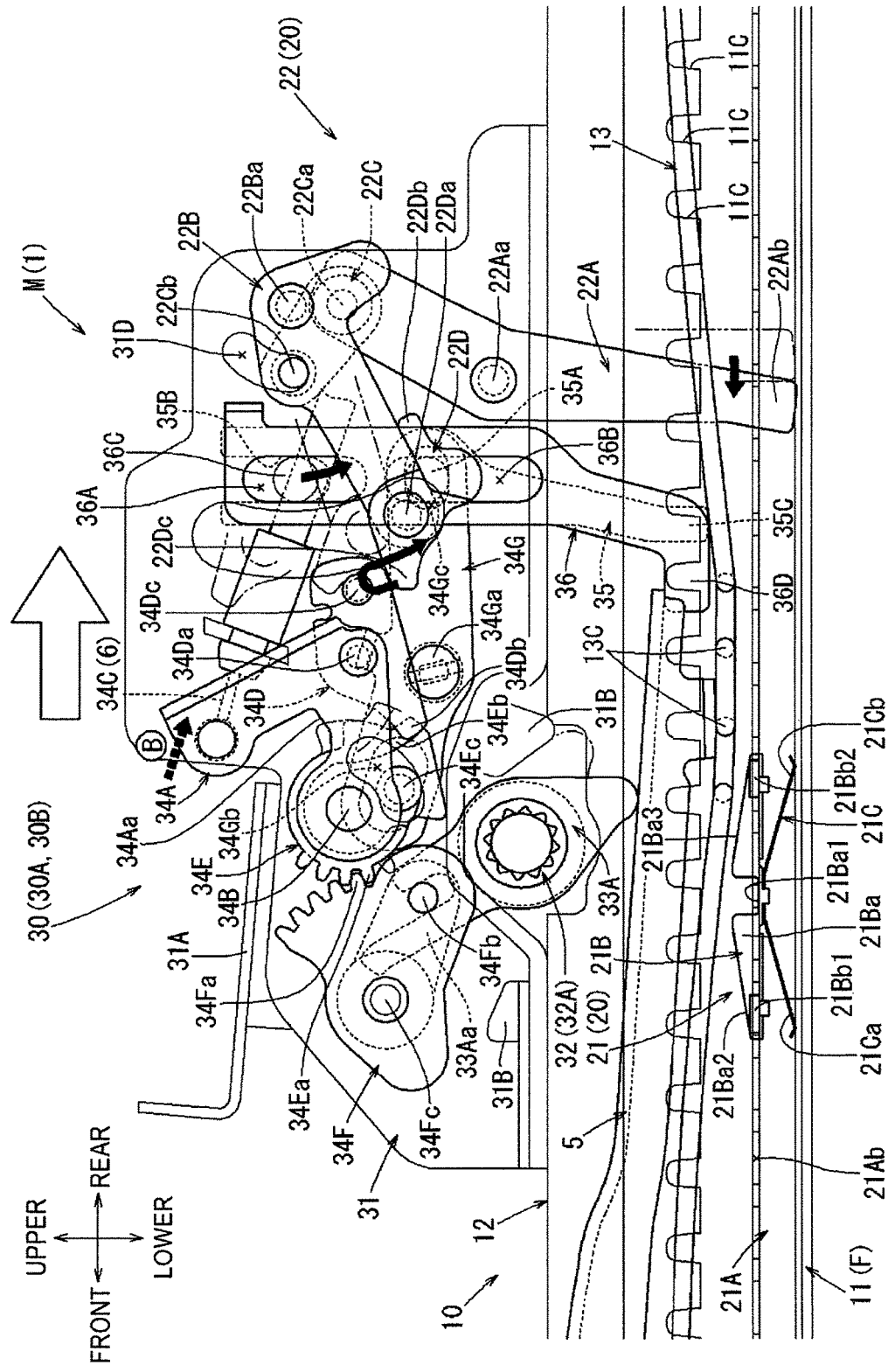
FIG. 18 is a side view showing a state in which the seat position is retracted in a state where the slide lock is released and maintained by operating the memory lever.
Figure 19:
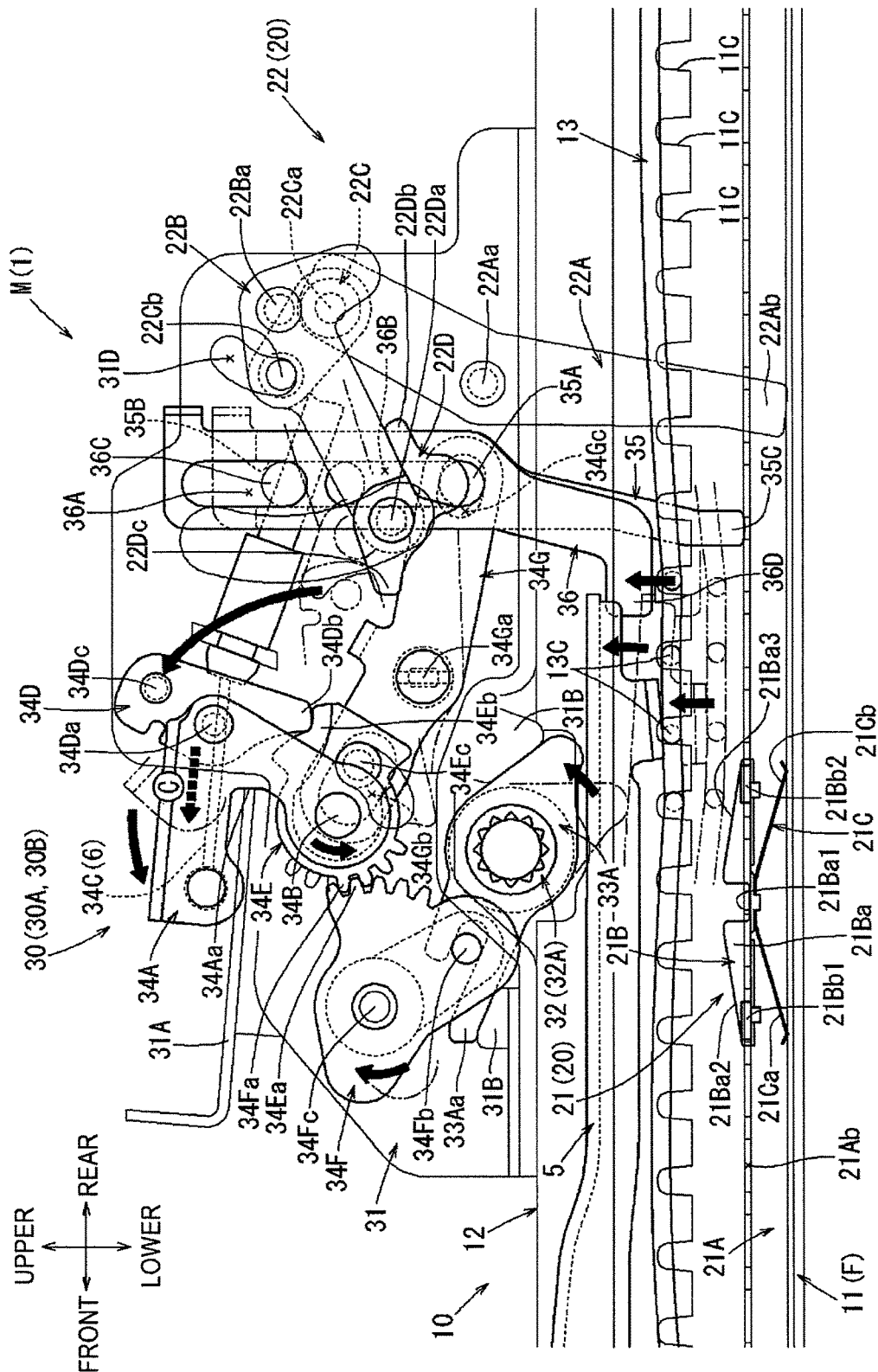
FIG. 19 is a side view showing a state in which the operation of the memory lever is released at the retracted position.

The above-described detection link 22A is normally biased to rotate in the clockwise direction (backward direction) in the figure, which causes the leg piece 22A*b* to be kicked up forward about the shaft pin 22A*a* by a spring (not shown) hooked between the above-described base bracket 31 and the detection link 22A. However, as shown in FIG. 15, when the above-described memory piece 21B is placed at a position corresponding to the moving position of the seat 1, the detection link 22A is maintained in a state of an upright posture where the above-described leg piece 22A*b* is stopped by being brought into contact with a rear end of the memory piece 21B. As shown in FIGS. 17 and 18, as the seat position is retracted while leaving the memory piece 21B by operating the above-described memory lever 6, the detection link 22A is switched to a state of the rearwardly tilted posture in which the leg piece 22A*b* is slightly kicked up forward by the spring biasing force described above, so that the detection link 22A is locked at that position by being brought into contact with the base bracket 31.

Figure 21:
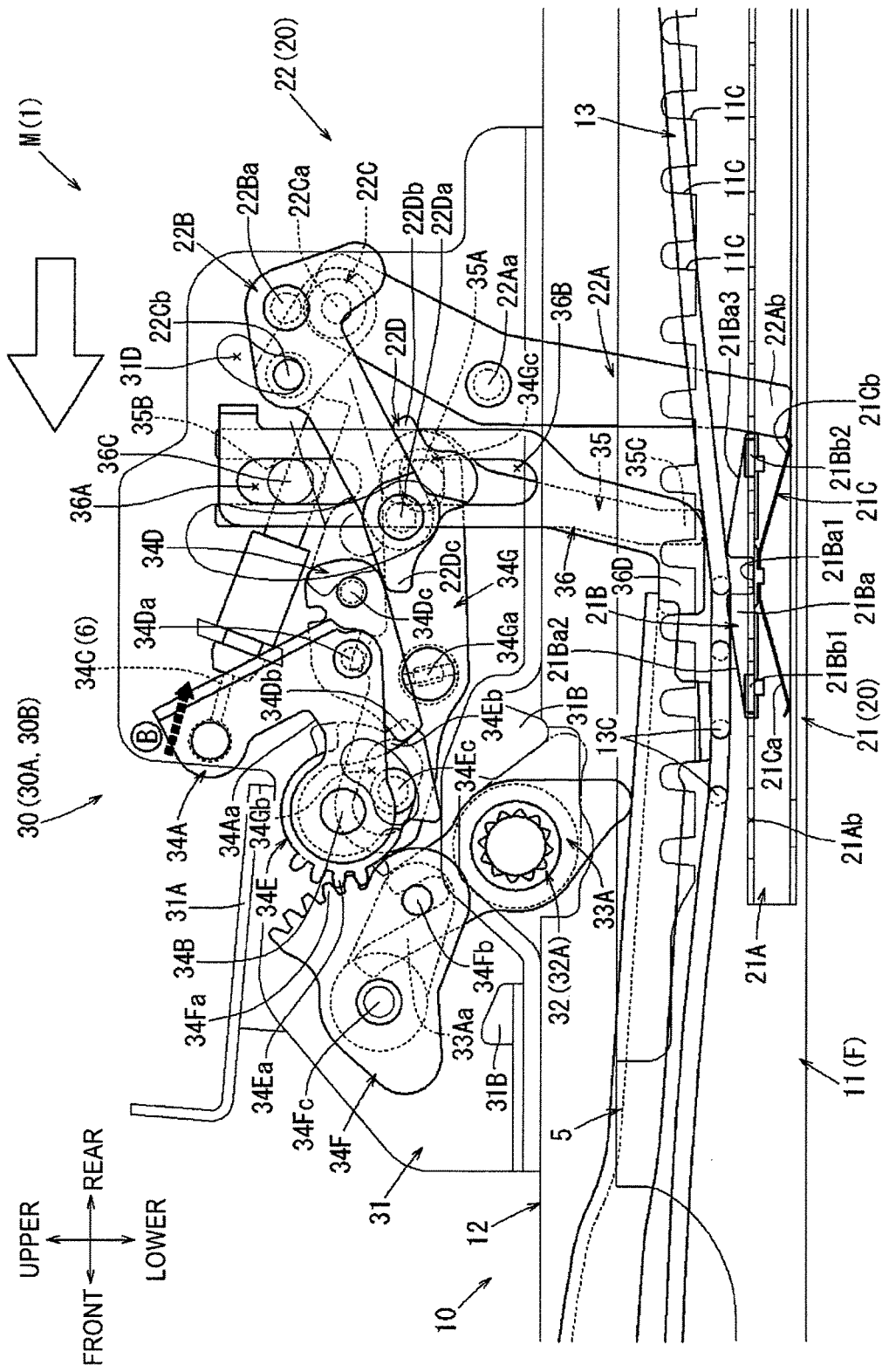
FIG. 21 is a side view showing a state in which a detection link advancing the seat position is brought into contact with the memory piece after the operation.
Figure 22:
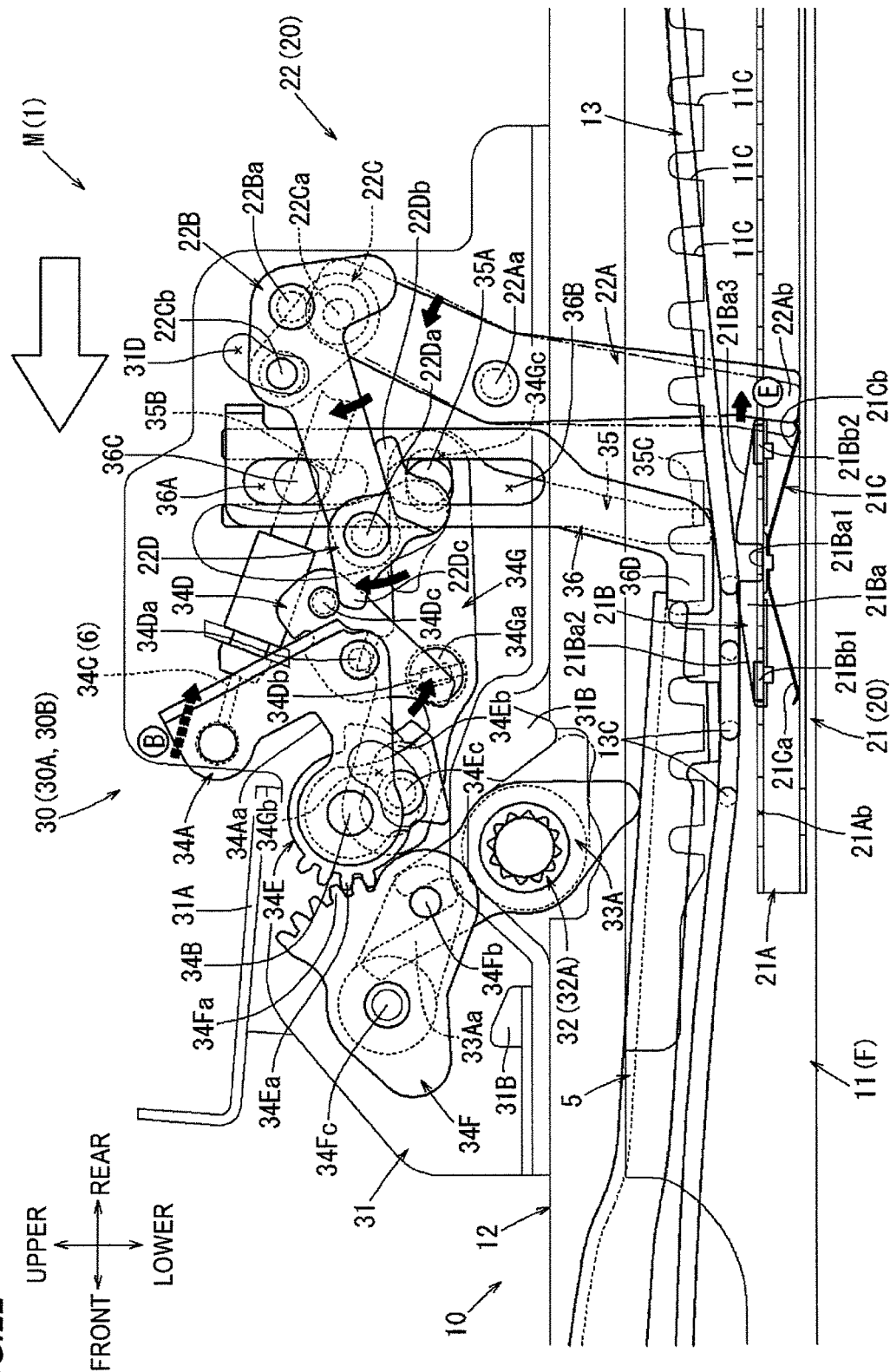
FIG. 22 is a side view showing a state in which the detection link is pushed and rotated by further advance movement of the seat position and the released state of the slide lock is cancelled.

As the above-described seat position is returned from the retracted position where the memory piece 21B is left to the default position where the memory piece 21B is placed as shown in FIGS. 21 and 22, the detection link 22A is rotated in the counter-clockwise direction (forward direction) in the figure to the position where the above-described leg piece 22A*b* is again pressed against the rear end of the memory piece 21B and is in a state of the upright posture about the shaft pin 22A*a*. With this rotation, the detection link 22A is adapted to lock the seat position at that position by releasing a locking/unlocking link 34D of the operation mechanism 30 (to be described later) from an engagement state with a driving gear 34E via the cancel link 22B connected to the upper end portion of the detection link 22A. Here, the locking/unlocking link 34D corresponds to the "contact part" in the disclosure.

As shown in FIGS. 8 to 10 and 15, the cancel link 22B is formed of a single plate material of steel or the like that is cut into a shape elongated in the front and rear direction. A rear end portion of the cancel link 22B is rotatably pin-connected to the base bracket 31 by the above-described shaft pin 22B*a*. As shown in FIG. 15, the above-described cancel link 22B is normally in a state of being biased to rotate in the counter-clockwise direction in the figure about the shaft pin 22B*a* by a spring (not shown) hooked between the above-described base bracket 31 and the cancel link 22B. With the above biasing, the cancel link 22B is normally maintained as a state in which the leg piece 22A*b* of the detection link 22A is pressed against the rear end of the memory piece 21B by applying a biasing force in the clockwise direction in the figure about the shaft pin 22A*a* to the detection link 22A connected to the cancel link 22B via the above-described connection link 22C.

As shown in FIG. 18, the leg piece 22A*b* of the above-described detection link 22A is released from the contact state with the memory piece 21B when the seat position is retracted while leaving the memory piece 21B by operating the above-described memory lever 6. In this way, the above-described cancel link 22B moves due to the biasing of the leg piece 22A*b* and presses the detection link 22A to be tilted to a rearwardly tilted posture. Further, with the movement of the cancel link 22B, a connection pin 22C*b* that is a connecting point with the connection link 22C reaches a lower end of an elongated hole 31D formed in the base bracket 31 and its movement is locked. The connection pin 22C*b* for connecting the cancel link 22B and the connection link 22C is inserted into the arcuate elongated hole 31D formed in the base bracket 31 and curved around a rotation center (the shaft pin 22B*a*) of the cancel link 22B and is configured to allow the cancel link 22B to rotate only within a range in which the cancel link 22B is movable within the elongated hole 31D.

As shown in FIGS. 8 to 10 and 15, the kick member 22D is rotatably pin-connected to the leading end portion of the above-described cancel link 22B by the above-described shaft pin 22D*a*. As shown in FIG. 15, the above-described kick member 22D is normally in a state of being biased to rotate in the counter-clockwise direction in the figure about the shaft pin 22D*a* by a spring (not shown) hooked between the cancel link 22B and the kick member 22D. With the above biasing, the kick member 22D is normally maintained at a position where a locking piece 22D*b* protruding from a rear end portion and bent in a crank shape on the outer side (right side) in the vehicle width direction is pressed against the cancel link 22B and locked.

As shown in FIG. 18, the above-described detection link 22A is switched to the rearwardly tilted posture when the seat position is retracted while leaving the memory piece 21B by the operation of the memory lever 6 described above. In this way, the above-described kick member 22D moves together with the cancel link 22B in the counter-clockwise direction in the figure around the rotation center (the shaft pin 22B*a*) of the cancel link 22B. At this time, the kick member 22D is placed in a positional relationship where a protruding pin 34D*c* of the locking/unlocking link 34D of the operation mechanism 30 (to be described later) interferes with a position on a movement trajectory of a kick piece 22D*c* protruding forward from the setting place of the shaft pin 22D*a* in accordance with the operation of the memory lever 6 described above. However, upon moving together with the cancel link 22B in the counter-clockwise direction in the figure around the rotation center (the shaft pin 22B*a*) of the cancel link 22B as described above, the kick member 22D passes over the lower side of the protruding pin 34D*c* while pivoting in the clockwise direction in the figure about the shaft pin 22D*a* in such a manner that the kick piece 22D*c* is pushed back by the protruding pin 34D*c* even when the kick piece 22D*c* is brought into contact with the protruding pin 34D*c* of the locking/unlocking link 34D. At the position where the kick member 22D passes over the protruding pin 34D*c*, the kick member 22D is configured to return its posture relative to the cancel link 22B to the original state by the spring biasing.

As the above-described seat position is returned from the retracted position where the memory piece 21B is left to the default position where the memory piece 21B is placed as shown in FIGS. 21 and 22, the above-described kick member 22D receives the power transmission from the detection link 22A rotating by being pressed against the rear end of the memory piece 21B and moves together with the cancel link 22B in the clockwise direction in the figure around the rotation center (the shaft pin 22B*a*) of the cancel link 22B. With the movement of the kick member 22D, the kick piece 22D*c* of the kick member 22D is pressed against the protruding pin 34D*c* of the above-described locking/unlocking link 34D from the lower side. However, at that time, the kick member 22D is in a state of being integrated with the cancel link 22B in the rotation direction. Therefore, the kick member 22D pushes the protruding pin 34D*c* in a manner of kicking the protruding pin 34D*c* upward in accordance with the movement of the kick member 22D, so that the locking/unlocking link 34D is released from the engagement state with the driving gear 34E and the seat position is locked at that position.

<Specific Configuration of Operation Mechanism 30>

Figure 8:
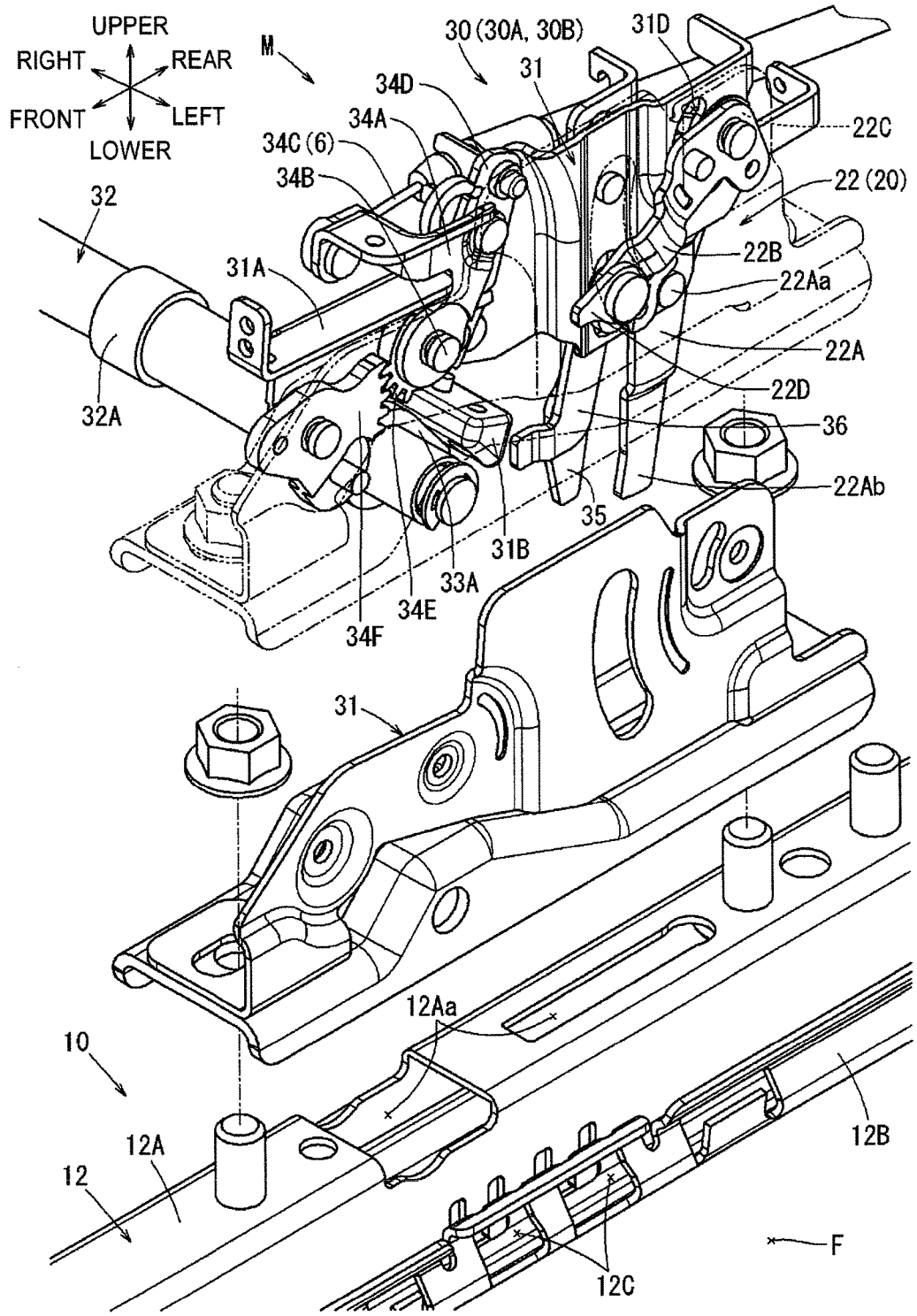
FIG. 8 is an exploded perspective view of a mechanical component assembled on the upper side of the slide rail.
Figure 9:
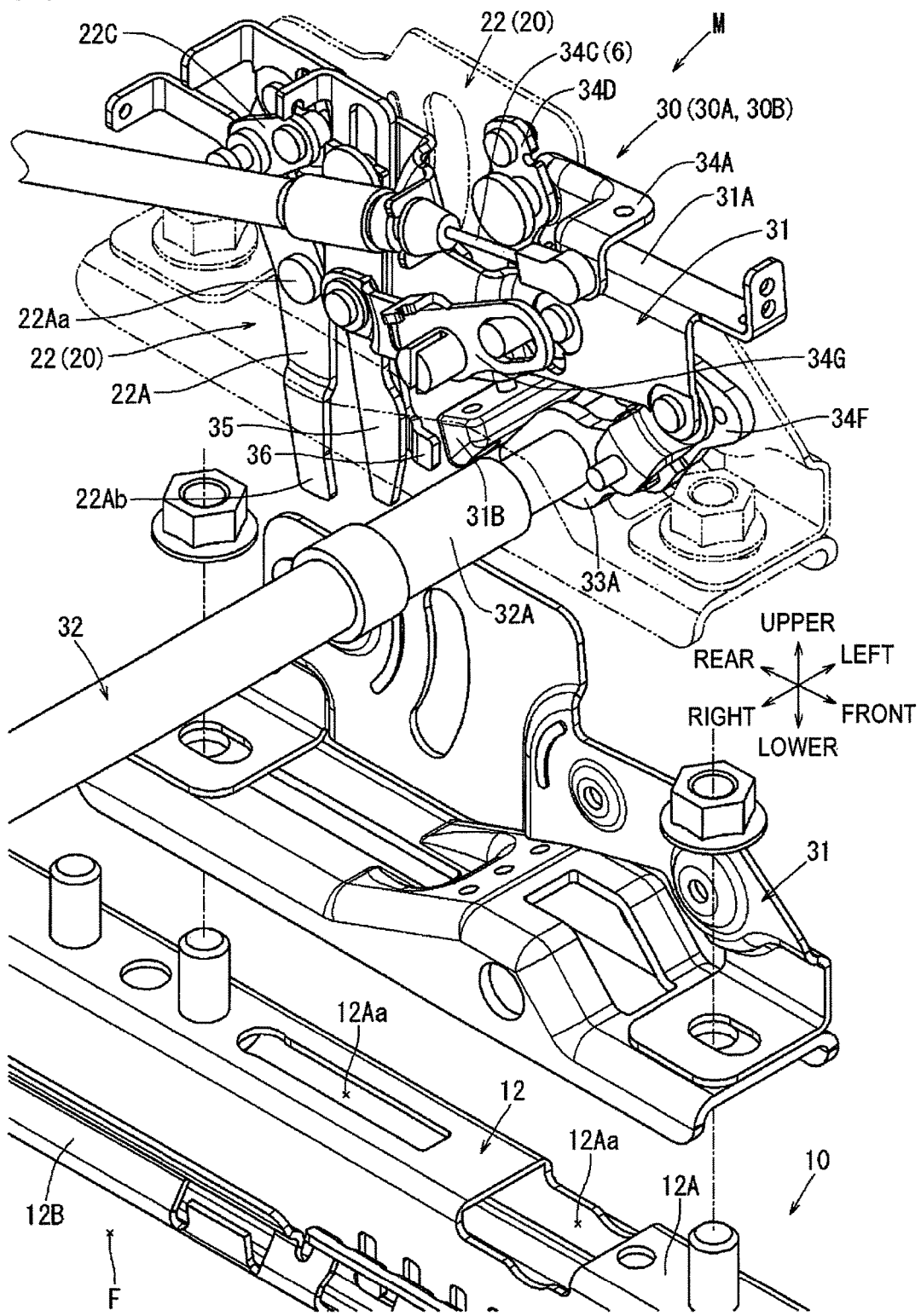
FIG. 9 is an exploded perspective view of the mechanical component, as seen from the opposite side.
Figure 10:
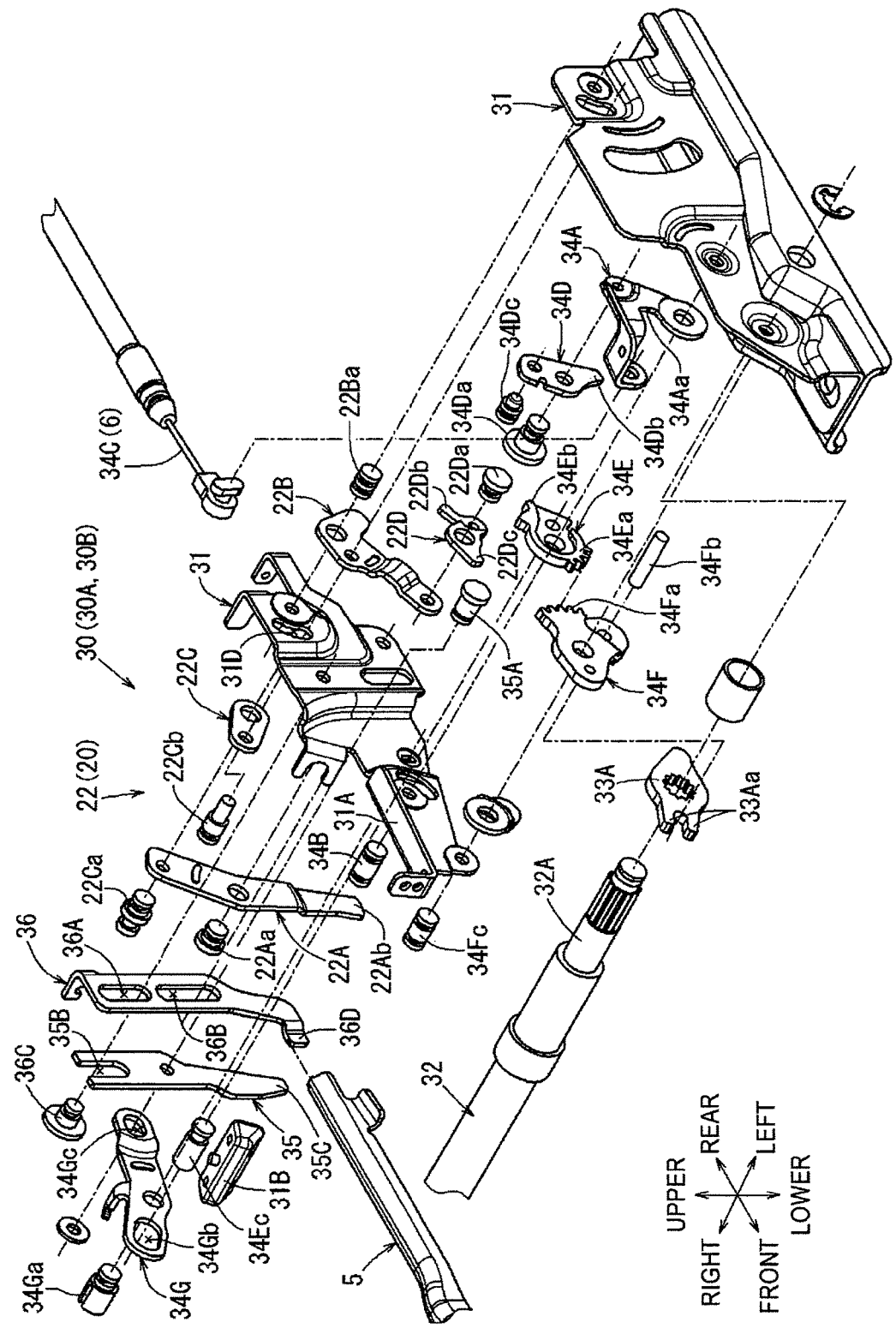
FIG. 10 is a further exploded perspective view of the mechanical component.

Subsequently, a specific configuration of the operation mechanism 30 will be described with reference to FIGS. 5 to 10 and 15. As shown in FIGS. 5 and 6, the operation mechanism 30 is configured such that each component is assembled to the base bracket 31 serving as a base provided on the upper rail 12 of the slide rail 10 on the inner side in the vehicle width direction. Specifically, as shown in FIG. 5, the operation mechanism 30 includes the rod 32 and release arms 33A, 33B. The rod 32 is rotatably pin-connected between the above-described base bracket 31 and a support bracket 16 provided on the upper rail 12 of the slide rail 10 on the outer side in the vehicle width direction via operation shafts 32A, 32B. The release arms 33A, 33B are integrally coupled to the operation shafts 32A, 32B of the rod 32 to synchronously perform the operation of unlocking the lock springs 13 in the slide rails 10 on the respective sides. As shown in FIGS. 8 to 10, the operation mechanism 30 further includes a power transmission structure, the memory link 35 and a power transmission link 36. The power transmission structure includes an input link 34A, the driving gear 34E, a driven gear 34F, and a seesaw link 34G, which are provided in a state of being rotatably pin-connected to the above-described base bracket 31. The memory link 35 and the power transmission link 36 are provided as a state of being guided slidably in the height direction with respect to the base bracket 31.

<Specific Configuration of Base Bracket 31, Rod 32, and each of Release Arms 33A, 33B>

The above-described base bracket 31 is formed in a shape having a bottom plate portion and a standing plate portion by combining a plurality of plate materials of steel or the like bent in a complicated shape. As shown in FIGS. 5 and 6, the base bracket 31 is provided in a state where the bottom plate portion is bolted on the top plate portion 12A of the above-described upper rail 12 and is integrally fixed thereto. As shown in FIGS. 8 to 10, the rod 32 is provided in a state of being rotatably pin-connected to the above-described base bracket 31 via the operation shaft 32A having an axis oriented in the vehicle width direction. Specifically, the above-described operation shaft 32A is rotatably pin-connected to the base bracket 31 in a state where it is integrally coupled to the operation shaft 32B (see FIG. 5) on the opposite side via the above-described rod 32.

Figure 16:
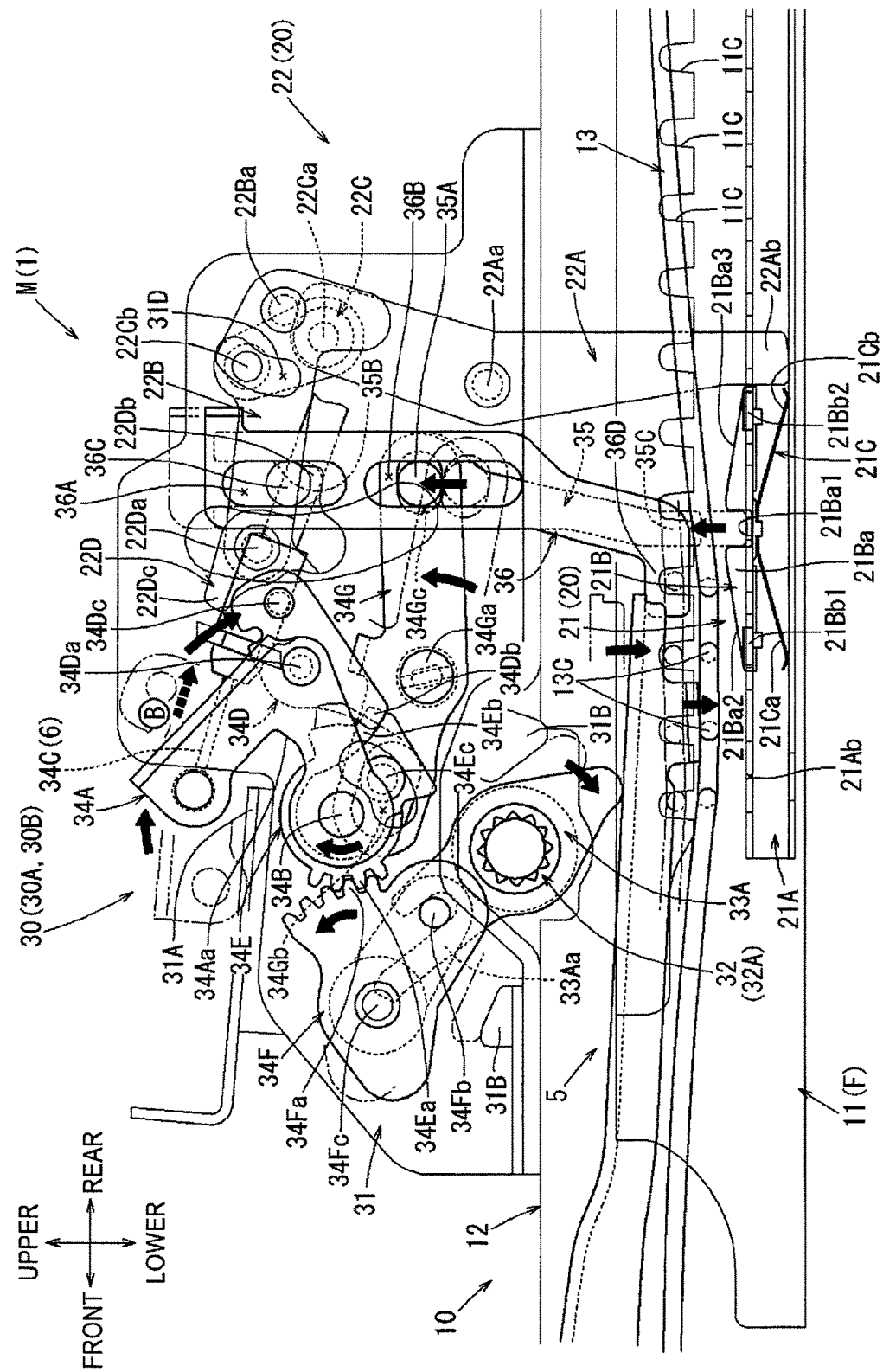
FIG. 16 is a side view showing a state in which the slide lock is released by operating the memory lever from the initial state shown in FIG. 15.

As shown in FIGS. 8 to 10, the release arm 33A having a cam shape is integrally connected to the above-described operation shaft 32A. The release arm 33A can be operated by pressing the loop handle 5 from the upper side in accordance with the pivoting operation of the operation shaft 32A. As shown in FIG. 15, a clamping piece 33A$a$ is formed in the above-described release arm 33A. The clamping piece 33A$a$ clamps, in the rotation direction, an engaging pin 34F$b$ protruding from the driven gear 34F (to be described later) in the vehicle width direction to receive a pivoting force from the driven gear 34F. With the above configuration, as shown in FIGS. 16 and 17, the release arm 33A receives the pivoting force from the driven gear 34F when the memory lever 6 (to be described later) is operated and the driven gear 34F is pushed and rotated. In this way, the release arm 33A is pushed and rotated in a direction opposite to the driven gear 34F to push and rotate the loop handle 5 downward. Then, by being pushed and rotated by the driven gear 34F, the release arm 33A integrally pivots the opposite release arm 33B coupled to the release arm 33A via the rod 32 to push and rotate the loop handle 5 on the same side downward.

Figure 5:
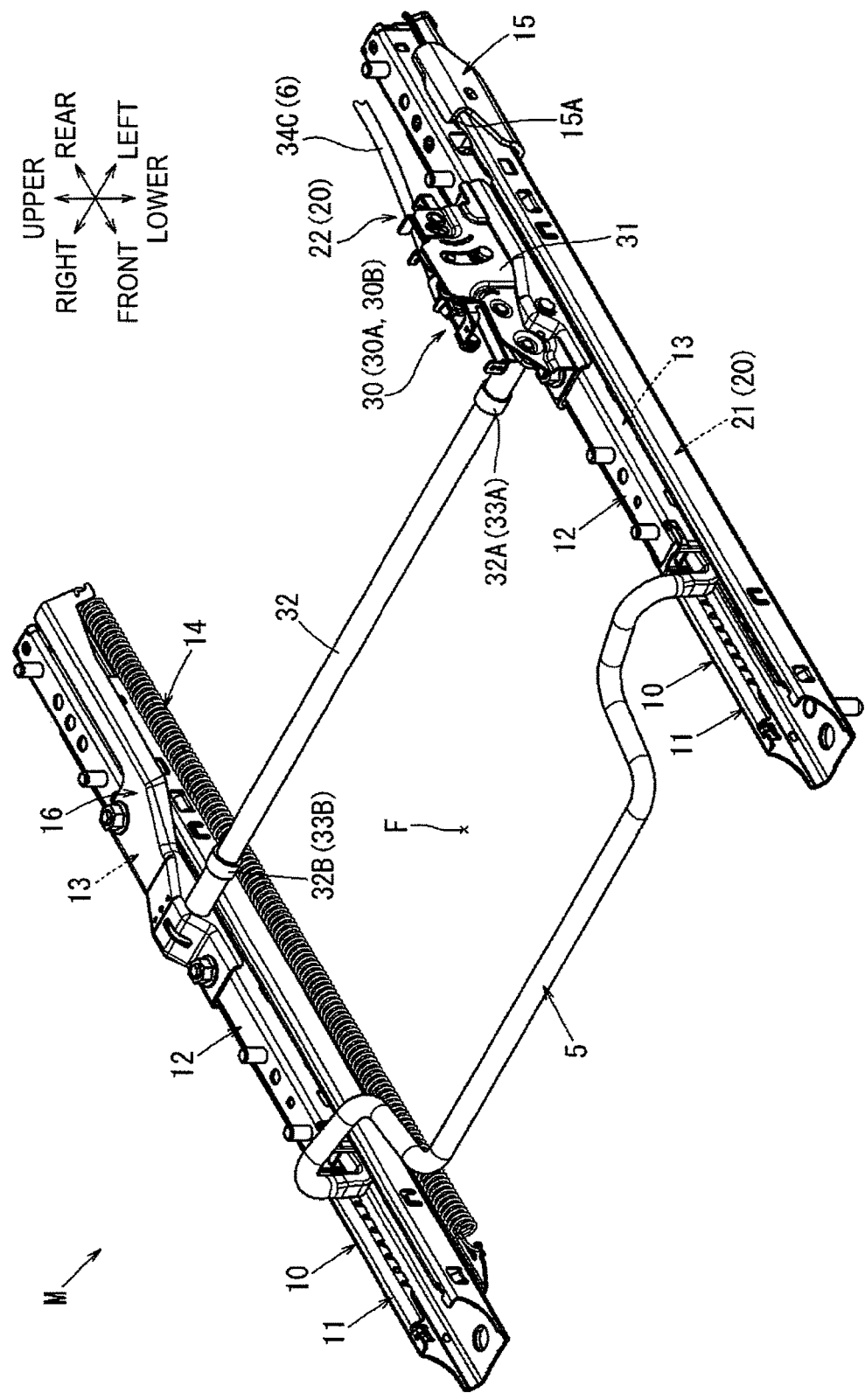
FIG. 5 is a perspective view showing an overall configuration of the vehicle slide rail device.

Here, as shown in FIG. 5, the above-described loop handle 5 is formed of a pipe material of steel or the like bent in a substantially U shape in a plan view. The loop handle 5 is assembled in a state where each end portion of the U shape is inserted into the upper rail 12 of the slide rail 10 on each side from the front side and is set on the lock portion 13C of the lock spring 13 on each side (see FIG. 11). The loop handle 5 is assembled in a state where each arm portion of the U shape inserted into each upper rail 12 is pin-connected to each upper rail 12 so as to be rotatable around an axis oriented in the vehicle width direction. With the above configuration, the loop handle 5 is operated so that the connecting portions of the U shape are pulled up by a user. In this way, as shown in FIGS. 12 and 13, the lock portion 13C of each lock spring 13 is pushed down by each end portion of the U shape and removed from the lock groove 11C of the lower rail 11.

<Specific Configuration of Input Link 34A>

As shown in FIGS. 10 and 15, the input link 34A is provided in a state of being rotatably pin-connected to the above-described base bracket 31 by a shaft pin 34B having an axis oriented in the vehicle width direction. As shown in FIG. 15, the input link 34A is normally biased to rotate in the counter-clockwise direction (forward direction) in the figure about the shaft pin 34B by a spring (not shown) hooked between the above-described base bracket 31 and the input link 34A. With the above biasing, the input link 34A is normally held in a state where a locking surface 34A$a$ that is a side surface in the counter-clockwise direction in the figure is locked in contact with a locking piece 31A formed in the base bracket 31.

A leading end portion of a cable 34C connected to the above-described memory lever 6 is connected to the portion of the above-described input link 34A extending forward and upward from the setting place of the shaft pin 34B. With the above connection, as shown in FIGS. 16 and 17, the input link 34A is rotated in the clockwise direction (backward direction) in the figure about the shaft pin 34B against the above-described spring biasing force (not shown) by operating the memory lever 6. Meanwhile, as shown in FIGS. 10 and 15, the above-described input link 34A has the separate locking/unlocking link 34D provided in a state of being rotatably pin-connected to the portion deviated upward from the setting position of the shaft pin 34B by a shaft pin 34D$a$ having an axis oriented in the vehicle width direction.

<Specific Configuration of Locking/Unlocking Link 34D and Driving Gear 34E>

The above-described locking/unlocking link 34D is normally biased to rotate in the clockwise direction (backward direction) in FIG. 15 about the shaft pin 34D$a$ by a spring (not shown) hooked between the above-described input link 34A and the locking/unlocking link 34D. With the above biasing, the locking/unlocking link 34D is normally maintained in a state where a locking/unlocking piece 34D$b$ extending downward from the setting position of the shaft pin 34D$a$ is locked by being pressed on an outer peripheral surface of the driving gear 34E that is pin-connected to the base bracket 31 so as to be rotatable around the same shaft pin 34B as the input link 34A.

As shown in FIGS. 16 and 17, the above-described locking/unlocking link 34D moves so as to be drawn in the rotation direction of the input link 34A by the shaft pin 34D$a$ that is a connection point with the input link 34A when the input link 34A is rotated in the clockwise direction (backward direction) in the figure about the shaft pin 34B by operating the above-described memory lever 6. With the above movement, the locking/unlocking link 34D is configured so that the locking/unlocking piece 34D$b$ pushes a corner portion 34E$b$ protruding on the outer peripheral surface of the driving gear 34E in the rotation direction to rotate the driving gear 34E integrally with the input link 34A. With the above rotation, the driving gear 34E pushes and rotates the driven gear 34F gear-connected to a gear portion 34E$a$ formed on the outer peripheral surface thereof to push and rotate the loop handle 5 downward via the above-described release arm 33A.

<Specific Configuration of Driven Gear 34F>

As shown in FIG. 15, the above-described driven gear 34F is provided as a state of being rotatably pin-connected to the above-described base bracket 31 by a shaft pin 34F*c* having an axis oriented in the vehicle width direction. The driven gear 34F is provided in a state where a gear portion 34F*c* formed on the outer peripheral portion thereof is gear-connected to the gear portion 34E*a* of the above-described driving gear 34E. An engaging pin 34F*b* protruding in the vehicle width direction is attached to the portion of the driven gear 34F deviated rearward and downward from the setting position of a shaft pin 34F*c*. The engaging pin 34F*b* is clamped by the clamping piece 33A*a* of the above-described release arm 33A from both sides in the rotation direction. With the above configuration, the driven gear 34F is connected to the release arm 33A so as to be capable of transmitting a pivoting force.

The above-described release arm 33A is normally in a state of being biased to rotate in the counter-clockwise direction in the figure about the operation shaft 32A by a biasing force of a spring (not shown) transmitted from the input link 34A via the above-described driven gear 34F. With the above biasing, the release arm 33A is normally maintained in a state of being locked by being brought into elastic contact with a rubber stopper 31B attached to the base bracket 31. As shown in FIGS. 16 and 17, when the input link 34A is rotated in the clockwise direction (backward direction) in the figure about the shaft pin 34B by operating the above-described memory lever 6, the release arm 33A is pushed and rotated in the clockwise direction in the figure about the operation shaft 32A by the driven gear 34F pushed and rotated via the above-described driving gear 34E to depress the loop handle 5.

<Specific Configuration of Seesaw Link 34G>

As shown in FIG. 15, the seesaw link 34G is provided in a state of being rotatably pin-connected to the above-described base bracket 31 by a shaft pin 34G*a* having an axis oriented in the vehicle width direction. The seesaw link 34G is configured such that elongated holes 34G*b*, 34G*c* are formed at a leading end of an arm part extending forward from the setting position of the shaft pin 34G*a* and a leading end of an arm portion extending rearward from the setting position, respectively. The elongated holes 34G*b*, 34G*c* extend in a rotation radial direction about the shaft pin 34G*a*. A connecting pin 34E*c*, which is attached to the position deviated rearward from the setting position of the shaft pin 34B of the above-described driving gear 34E and protrudes in the vehicle width direction, is set in a state of being inserted into the elongated hole 34G*b* on the front side. A connecting pin 35A, which is attached to an intermediate portion in the height direction of the memory link 35 (to be described later) and protrudes in the vehicle width direction, is set in a state of being inserted into the elongated hole 34G*c* on the rear side.

The seesaw link 34G having the above configuration is normally held in a state where its rotation posture is fixed by the driving gear 34E via the connecting pin 34E*c* inserted into the elongated hole 34G*b* on the front side. In this way, the position of the seesaw link 34G in the height direction of the memory link 35 is fixed via the connecting pin 35A inserted into the elongated hole 34G*c* on the rear side. Specifically, the seesaw link 34G is fixed at a position in the height direction where the leg piece 35C on the lower end side of the above-described memory link 35 is in a state of having entered the concave surface portion 21B*a*1 of the memory piece 21B. As shown in FIGS. 16 and 17, when the input link 34A is rotated integrally with the driving gear 34E in the clockwise direction (backward direction) in the figure about the shaft pin 34B by operating the above-described memory lever 6, the above-described seesaw link 34G is rotated in the counter-clockwise direction in the figure about the shaft pin 34G*a* in a manner of being pushed and rotated by the driving gear 34E. In this way, the seesaw link 34G is operated to lift the memory link 35 via the connecting pin 35A inserted into the elongated hole 34G*c* on the rear side and is adapted to remove the leg piece 35C on the lower end side of the memory link 35 from the concave surface portion 21B*a*1 of the memory piece 21B.

<Specific Configuration of Memory Link 35>

As shown in FIGS. 8 to 10 and 15, the memory link 35 is formed of a single plate material of steel or the like that is cut into a shape elongated in the height direction. As shown in FIGS. 10 and 15, when the connecting pin 35A, which is attached to an intermediate portion in the height direction of the memory link 35 and has an axis oriented in the vehicle width direction, is set in a state of being inserted into the elongated hole 34G*c* on the rear side of the above-described seesaw link 34G, the memory link 35 is in a state of being rotatably pin-connected to the seesaw link 34G Further, an elongated hole 35B extending in a shape opening upward from the intermediate portion to the upper end portion of the memory link 35 in the height direction is formed in the memory link 35, and an engaging pin 36C fixed to the base bracket 31 is set in a state of being inserted into the elongated hole 35B. With the above configuration, the memory link 35 is supported by the engaging pin 36C in a state of being movable in the height direction with respect to the above-described base bracket 31 and is adapted to be raised or lowered in accordance with the rotational movement of the seesaw link 34G connected to the intermediate portion of the memory link 35 (see FIGS. 15 and 16).

As shown in FIG. 15, when the above-described seesaw link 34G is held in a state where its rotation posture is fixed by the driving gear 34E, the above-described memory link 35 is normally held in a posture in which the leg piece 35C on the lower end side thereof is inserted into the concave surface portion 21B*a*1 of the memory piece 21B. As shown in FIGS. 16 and 17, when the input link 34A is rotated integrally with the driving gear 34E in the clockwise direction (backward direction) in the figure about the shaft pin 34B by operating the above-described memory lever 6, the memory link 35 is operated to be lifted upward by the seesaw link 34G rotating in the counter-clockwise direction in the figure about the shaft pin 34G*a* in accordance with the movement of the memory link 35 and is adapted to remove the leg piece 35C on the rear end side thereof from the concave surface portion 21B*a*1 of the memory piece 21B.

On the other hand, as shown in FIGS. 12 and 13, when the loop handle 5 is operated, the above-described memory link 35 is operated to be pushed downward in accordance with the movement of the power transmission link 36 which is operated to be pushed down by the push down movement of the loop handle 5. Specifically, the memory link 35 is normally in a state of being biased to move in a direction to be pushed down against the power transmission link 36 by a biasing force of a spring (not shown) hooked between the above-described power transmission link 36 and the memory link 35. With the above biasing, the memory link 35 is normally held in a state where the connecting pin 35A that is a connecting point with the above-described seesaw link 34G is locked by being elastically pressed against a lower end of a second elongated hole 36B of the power transmission link 36.

With the above configuration, the memory link 35 is operated to be pushed down in accordance with the movement of the above-described power transmission link 36 to be pushed down by operating the loop handle 5 and is adapted to push down the memory piece 21B by its leg piece 35C to release the memory piece 21B from the engagement state with the memory rail 21A. Specifically, as shown in FIG. 12, the above-described memory link 35 is configured to perform an operation of pushing down the memory piece 21B in advance so that the memory piece 21B is completely released from the engagement state with the memory rail 21A before the lock portions 13C of the lock spring 13 are completely removed from the lock grooves 11C of the lower rail 11 by performing an operation of pushing down the above-described loop handle 5. With such a configuration, as shown in FIG. 13, the memory piece 21B is reliably released from the engagement state with the memory rail 21A when the lock portions 13C of the lock spring 13 are removed from the lock grooves 11C of the lower rail 11. In this way, the seat position can be smoothly adjusted.

<Specific Configuration of Power Transmission Link 36>

As shown in FIGS. 8 to 10 and 15, the power transmission link 36 is formed of a single plate material of steel or the like that is cut into a shape elongated in the height direction. As shown in FIGS. 10 and 11, the power transmission link 36 is configured in such a way that a first elongated hole 36A and the second elongated hole 36B extending in the height direction are formed at an upper portion and an intermediate portion thereof, respectively. The power transmission link 36 is set in a state where the elongated hole 35B of the above-described memory link 35 overlaps with the above-described first elongated hole 36A in the vehicle width direction. The engaging pin 36C fixed to the base bracket 31 is inserted through the elongated hole 35B and the first elongated hole 36A in the vehicle width direction. Further, the power transmission link 36 is in a state where the connecting pin 35A of the above-described memory link 35, which is a connecting portion with the seesaw link 34G, is inserted into the above-described second elongated hole 36B. Further, the above-described power transmission link 36 is normally in a state of being biased to move in the direction of being lifted upward with respect to the base bracket 31 by a biasing force of a spring (not shown) hooked between the above-described base bracket 31 and the power transmission link 36. At this time, the above-described power transmission link 36 is in a state of being held at the position where the engaging pin 36C is locked by being brought into contact with a lower end of the above-described first elongated hole 36A.

As shown in FIGS. 12 and 13, the above-described power transmission link 36 is operated such that a pressure receiving piece 36D extending to be bent forward from the lower end thereof is pushed down by being pressed downward by a rear end portion of the loop handle 5 by operating the loop handle 5. In this way, the power transmission link 36 is operated to push the memory link 35 downward by a force of a spring (not shown) hooked between the above-described memory link 35 and the power transmission link 36 and is operated to release the memory piece 21B from the engagement state with the memory rail 21A.

<Overall Operation>

To summarize the above, the memory mechanism 20 and the operation mechanism 30 configuring the above-described slide rail device M are adapted to be moved so that the seat position can be adjusted in the following manner by operating the loop handle 5 and the memory lever 6 described above. First, as shown in FIG. 4, the configuration of each part when the seat position is adjusted by operating the loop handle 5 will be described. In the following description, as shown in FIGS. 11 and 15, the state in which the concave surface portion 21Ba1 of the memory piece 21B is positioned directly below the leg piece 35C of the memory link 35, the detection link 22A is brought into an upright posture in which the leg piece 22Ab is brought into contact with the rear end of the memory piece 21B, and the lock portions 13C of the lock spring 13 are locked by being inserted into the lock grooves 11C of the lower rail 11 will be described as an initial state.

When the loop handle 5 is operated from the initial state, as shown by the circled letter "A" in FIG. 12, the power transmission link 36 is operated to be pushed down by the rear end portion of the loop handle 5, and the memory link 35 is also operated to be pushed down by the movement. In this way, the memory piece 21B is operated to be pushed down by the leg piece 35C of the memory link 35 and is released from the engagement state with the memory rail 21A. Further, as the operation of the loop handle 5 progresses, as shown in FIG. 13, the lock portions 13C of the lock spring 13 are operated to be pushed down directly by the loop handle 5 and are removed from the lock grooves 11C of the lower rail 11. With the above operation, the slide locked state by the lock spring 13 is released, and the seat position can be adjusted in the front and rear direction, as shown in FIG. 14. Specifically, the seat position can be adjusted in the front and rear direction while carrying the memory piece 21B by the memory link 35 pushed down as described above. Further, by returning the operation of the loop handle 5 after changing the seat position, the operation state of each part described above is returned in the same way as in the state shown in FIG. 11, and it is possible to return the seat position to the locked state at that position.

Subsequently, as shown in FIGS. 1 to 3, the configuration of each part when the seat position is adjusted by operating the memory lever 6 will be described. Specifically, when the memory lever 6 is operated from the above-described initial state, as shown by the circled letter "B" in FIGS. 16 and 17, the input link 34A is rotated by the cable 34C, and the driving gear 34E is also pushed and rotated in the same manner via the locking/unlocking link 34D. In this way, power is transmitted from the driven gear 34F to the release arm 33A, the loop handle 5 is pushed down by the release arm 33A, and the lock portions 13C of the lock spring 13 are removed from the lock grooves 11C of the lower rail 11. Further, at this time, along with the rotation of the above-described driving gear 34E, the seesaw link 34G is rotated and lifted so that the memory link 35 is removed from the concave surface portion 21Ba1 of the memory piece 21B. In this way, as shown in FIG. 18, the seat position can be freely adjusted in the rear region of the memory piece 21B while leaving the memory piece 21B in a state of being engaged with the memory rail 21A. Further, by returning the operation of the memory lever 6 after changing the seat position, as shown by the circled letter "C" in FIG. 19, the operation state of each part described above is returned, and it is possible to return the seat position to the locked state at that position.

Figure 20:
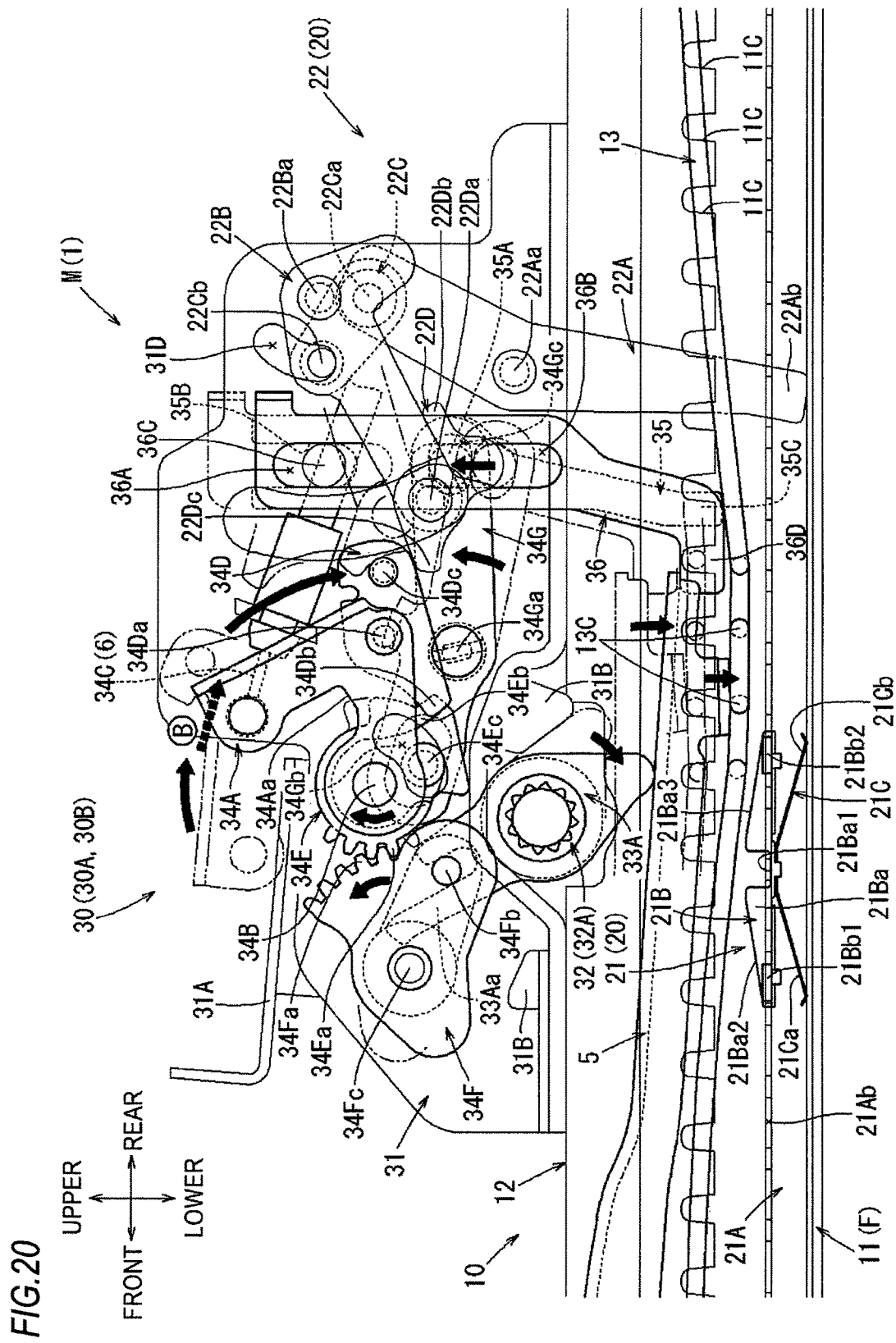
FIG. 20 is a side view showing a state in which the memory lever is operated again at the retracted position.
Figure 23:
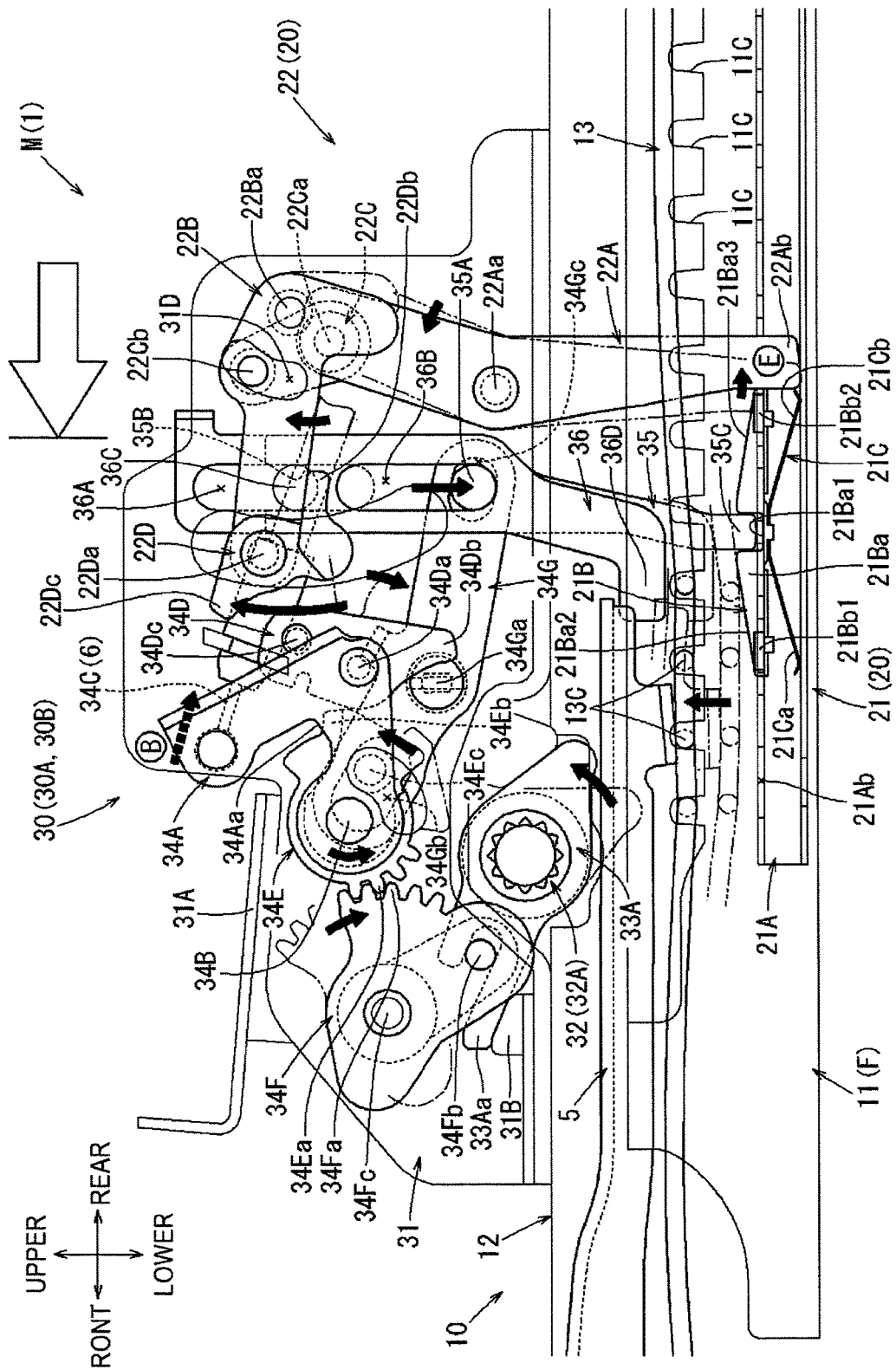
FIG. 23 is a side view showing a state in which the seat position is returned and locked to the default position by the cancellation.

Further, by operating the memory lever 6 again at the position where the seat position is adjusted, as shown by the circled letter "B" in FIG. 20, each part is operated as in the case described above with reference to FIGS. 16 and 17, and the seat position can be adjusted again in the front and rear direction. Further, by returning the seat position to the front position where the memory piece 21B is left while maintaining the operated state of the memory lever 6, as shown in FIG. 21, the detection link 22A is brought into contact with the rear end of the memory piece 21B and is further moved back to the front position. With this movement, as shown by the circled letter "E" in FIG. 22, the detection link 22A is rotated by its movement pushed into the rear end of the memory piece 21B, and the cancel link 22B is rotated in a direction in which it is lifted integrally with the kick member 22D. In this way, the locking/unlocking link 34D is pushed and kicked by the kick member 22D and is released from the engagement state with the driving gear 34E. Thus, as shown in FIG. 23, the driving gear 34E and the driven gear 34F are rotated in a direction in which the rotation is returned by a spring biasing force (not shown), and the lock spring 13 is returned to a state in which the lock portions 13C are inserted into the lock grooves 11C of the lower rail 11. Furthermore, along with this, the seesaw link 34G is rotated by the rotation of the driving gear 34E, and the leg piece 35C of the memory link 35 is returned to a state in which it is inserted into the concave surface portion 21B*a* 1 of the memory piece 21B. With this operation, by returning the seat position to the front side while maintaining the operated state of the memory lever 6, the seat position can be returned to the default position where the memory piece 21B is left, so that the seat position can be returned to the locked state at that position. Thereafter, by returning the operation of the memory lever 6, the locking/unlocking link 34D is again returned to the initial position where it is engaged with the driving gear 34E as shown in FIG. 15.

<Summary>

To summarize the above, the slide rail device M of the present embodiment has the following configurations. That is, the vehicle slide rail device (slide rail device M) includes the slide rail (slide rail 10) which is capable of adjusting the seat position when the lock mechanism (lock spring 13) is released, and the memory mechanism (memory mechanism 20) which includes the memory member (memory piece 21B) configured to define the default position, which is the seat position before change, by mechanical engagement to allow the seat position to return to the default position. The vehicle slide rail device (slide rail device M) includes the release operation mechanism (release operation mechanism 30A) which is configured to release the lock mechanism (lock spring 13) from the locked state and slide together with the memory member (memory piece 21B) in a slide direction by removing the memory member (memory piece 21B) from a state of defining the default position, the release operation member (loop handle 5) which is configured to operate the release operation mechanism (release operation mechanism 30A) by transmitting an operating force to the release operation mechanism (release operation mechanism 30A), the memory operation mechanism (memory operation mechanism 30B) which is configured to release the lock mechanism (lock spring 13) from the locked state while leaving the memory member (memory piece 21B) in the state of defining the default position, the memory operation member (memory lever 6) which is configured to be operated into an operated state in which an operating force is transmitted to the memory operation mechanism (memory operation mechanism 30B) so as to operate the memory operation mechanism (memory operation mechanism 30B) and which is configured to return the memory operation mechanism (memory operation mechanism 30B) to a state before the operation when the memory operation member (memory lever 6) is returned from the operated state, and the cancel mechanism (trigger 22) which is pressed against the memory member (memory piece 21B) to cancel the releasing of the lock mechanism (lock spring 13) by the memory operation mechanism (memory operation mechanism 30B) and return the lock mechanism (lock spring 13) to the locked state when the seat position is returned to the default position defined by the memory member (memory piece 21B) while the operated state of the memory operation member (memory lever 6) is maintained.

With such a configuration, when the release operation member (loop handle 5) is operated, the seat position can be adjusted in such a way that the default position is changed by sliding together with the memory member (memory piece 21B). Further, when the memory operation member (memory lever 6) is operated, the seat position can be adjusted while leaving the memory member (memory piece 21B) in the state of defining the default position. At that time, by stopping the operation of the memory operation member (memory lever 6) at an arbitrary position where the seat position is changed, the seat position can be locked at the arbitrary position. Further, when the seat position is returned to the default position where the memory member (memory piece 21B) is left while maintaining the operated state of the memory operation member (memory lever 6), the seat position can be locked at that position (default position) by the action of the cancel mechanism (trigger 22). In this way, while maintaining the state of defining the default position of the seat position by operating the memory operation member (memory lever 6), by releasing the operation of the memory operation member (memory lever 6) at an appropriate position, the seat position can be freely locked in positions other than the default position and the convenience of the memory mechanism (memory mechanism 20) is improved.

Further, the cancel mechanism (trigger 22) includes the one-way operation structure (one-way operation structure of the kick member 22D) which allows the lock mechanism (lock spring 13) to return to the locked state by pressing the contact part (locking/unlocking link 34D) configuring a power transmission path of the memory operation mechanism (memory operation mechanism 30B) from a first direction and releasing the contact part (locking/unlocking link 34D) from a contact state in which power transmission is capable when the cancel mechanism (trigger 22) is pressed against the memory member (memory piece 21B) by returning the seat position to the default position, and which maintains the contact part (locking/unlocking link 34D) in the contact state in which power transmission is capable without moving the contact part when the cancel mechanism (trigger 22) is pressed against the contact part (locking/unlocking link 34D) from a second direction different from the first direction by changing the seat position from the default position by operating the memory operation member (memory lever 6).

With such a configuration, the cancel mechanism (trigger 22), which is configured to cancel the operation state of the memory operation mechanism (memory operation mechanism 30B) and return the lock mechanism (lock spring 13) to the locked state when the seat position is returned to the default position, can be appropriately released so as not to hinder the movement of the memory operation member (memory lever 6) when the memory operation member (memory lever 6) is operated.

<Other Embodiments>

Although the embodiments of the disclosure have been described using one embodiment, the disclosure can be implemented in various forms other than the above embodiment. For example, the configuration of the vehicle slide rail device of the disclosure may be widely applied to seats provided for various vehicles other than automobiles, such as trains, aircrafts or ships, in addition to seats of an automobile other than the driver's seat. Further, the slide rail may change the seat position in the vehicle width direction. Further, the slide rail may be used for connecting a seat back to a vehicle body such as a sidewall of a vehicle in a state of being able to adjust a backrest angle, as disclosed in the literature such as JP-A-2010-274738.

Further, the lock mechanism of the slide rail is not limited to the locking type in which the spring itself attached to the upper rail (movable side rail) enters the lock groove of the lower rail (fixed side rail) by biasing and is locked, as described in the above embodiment. For example, as disclosed in the literature such as JP-A-2014-189218, the slide rail lock mechanism may have the locking type in which the lock claw attached to the upper rail enters the lock groove of the lower rail by a spring biasing force and is locked.

Further, the memory mechanism is not limited to the configuration which is used to define the default position of the seat position and temporarily retract the seat position from the default position. For example, the memory mechanism may be used to temporarily advance the seat position from the default position.

Further, the release operation mechanism and the release operation member for operating the release operation mechanism are not limited to the configurations whose part is configured by an operation member itself such as a loop handle, but may be configured by a member which is operated by an operation member. Further, the release operation member may be configured by a slide member of a linearly-moving type, in addition to the link member of a rotary-moving type.

What is claimed is:

1. A vehicle slide rail device comprising:
   a slide rail which is capable of adjusting a seat position when a lock mechanism is released;
   a memory mechanism which includes a memory member configured to define a default position, which is the seat position before change, by mechanical engagement to allow the seat position to return to the default position;
   a release operation mechanism which is configured to release the lock mechanism from a locked state and slide together with the memory member in a slide direction by removing the memory member from a state of defining the default position;
   a release operation member which is configured to operate the release operation mechanism by transmitting an operating force to the release operation mechanism;
   a memory operation mechanism which is configured to release the lock mechanism from the locked state while leaving the memory member in the state of defining the default position;
   a memory operation member which is configured to be operated into an operated state in which an operating force is transmitted to the memory operation mechanism so as to operate the memory operation mechanism and which is configured to return the memory operation mechanism to a state before the operation when the memory operation member is returned from the operated state; and
   a cancel mechanism which is pressed against the memory member to cancel the releasing of the lock mechanism by the memory operation mechanism and return the lock mechanism to the locked state when the seat position is returned to the default position defined by the memory member while the operated state of the memory operation member is maintained.

2. The vehicle slide rail device according to claim 1, wherein the cancel mechanism includes a one-way operation structure which allows the lock mechanism to return to the locked state by pressing a contact part configuring a power transmission path of the memory operation mechanism from a first direction and releasing the contact part from a contact state in which power transmission is capable when the cancel mechanism is pressed against the memory member by returning the seat position to the default position, and which maintains the contact part in the contact state in which power transmission is capable without moving the contact part when the cancel mechanism is pressed against the contact part from a second direction different from the first direction by changing the seat position from the default position by operating the memory operation member.

* * * * *